US010757690B2

(12) United States Patent
Sun et al.

(10) Patent No.: US 10,757,690 B2
(45) Date of Patent: Aug. 25, 2020

(54) CONTROL INFORMATION PIGGYBACK IN SHARED CHANNEL

(71) Applicant: QUALCOMM Incorporated, San Diego, CA (US)

(72) Inventors: Jing Sun, San Diego, CA (US); Jing Jiang, San Diego, CA (US); Wanshi Chen, San Diego, CA (US); Peter Pui Lok Ang, San Diego, CA (US); Tao Luo, San Diego, CA (US); Yang Yang, San Diego, CA (US); Jamie Menjay Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 15/593,237

(22) Filed: May 11, 2017

(65) Prior Publication Data

US 2018/0124753 A1 May 3, 2018

Related U.S. Application Data

(60) Provisional application No. 62/417,010, filed on Nov. 3, 2016.

(51) Int. Cl.
*H04W 72/04* (2009.01)
*H04L 1/00* (2006.01)

(52) U.S. Cl.
CPC ......... *H04W 72/042* (2013.01); *H04L 1/0079* (2013.01); *H04L 1/0088* (2013.01)

(58) Field of Classification Search
None
See application file for complete search history.

(56) References Cited

U.S. PATENT DOCUMENTS

| 2010/0111226 | A1* | 5/2010 | Ko | H04B 7/0639 375/299 |
| 2013/0016687 | A1* | 1/2013 | Yang | H04L 1/1614 370/329 |
| 2013/0039272 | A1* | 2/2013 | Chen | H04W 76/25 370/328 |
| 2013/0114495 | A1* | 5/2013 | Chen | H04L 1/0004 370/312 |
| 2013/0242882 | A1* | 9/2013 | Blankenship | H04W 72/042 370/329 |

(Continued)

FOREIGN PATENT DOCUMENTS

EP 2525522 A1 11/2012

OTHER PUBLICATIONS

International Search Report and Written Opinion—PCT/US2017/059571—ISA/EPO—dated Mar. 26, 2018.

*Primary Examiner* — Noel R Beharry
*Assistant Examiner* — Pamit Kaur
(74) *Attorney, Agent, or Firm* — Kevin M. Donnelly; Loza & Loza, LLP

(57) ABSTRACT

Aspects of the disclosure relate to wireless communication systems configured to provide piggyback downlink control information within the physical downlink shared channel (PDSCH). A first downlink control information portion may be transmitted within the physical downlink control channel (PDCCH) and may include information indicating a size of a second downlink control information portion transmitted within the PDSCH.

25 Claims, 13 Drawing Sheets

(56) References Cited

U.S. PATENT DOCUMENTS

| | | |
|---|---|---|
| 2014/0177586 A1 | 6/2014 | Jang et al. |
| 2015/0085787 A1* | 3/2015 | Ouchi .................. H04L 5/0037 370/329 |
| 2016/0065338 A1* | 3/2016 | Kim ........................ H04L 5/005 370/330 |
| 2016/0128028 A1 | 5/2016 | Mallik et al. |

* cited by examiner

DL-Centric Slot

CONTROL INFORMATION PIGGYBACK IN SHARED CHANNEL

PRIORITY CLAIM

This application claims priority to and the benefit of Provisional Patent Application No. 62/417,010 filed in the U.S. Patent and Trademark Office on Nov. 3, 2016, the entire content of which is incorporated herein by reference as if fully set forth below in its entirety and for all applicable purposes.

TECHNICAL FIELD

The technology discussed below relates generally to wireless communication systems, and more particularly, to the efficient transmission of downlink control information (DCI). Embodiments can provide techniques for piggybacking the DCI in the physical downlink shared channel (PDSCH).

INTRODUCTION

In a fourth-generation (4G) wireless communication network that follows standards for an evolved UMTS Terrestrial Radio Access Network (eUTRAN, also commonly known as LTE), over-the-air transmissions of information are assigned to various physical channels. Very generally, these physical channels carry user data traffic and control information. For example, a Physical Downlink Shared Channel (PDSCH) is the main traffic bearing downlink channel. A Physical Downlink Control Channel (PDCCH) carries downlink control information (DCI) providing downlink assignments and/or uplink grants of time-frequency resources to a user equipment (UE) or a group of UEs. These channels are time-divided into frames, and the frames are further subdivided into subframes, slots, and symbols.

In general, subframes or slots follow a pattern where the control information is time division multiplexed (TDM) with the traffic information, with the control information being transmitted at the beginning of a subframe or slot. Next generation (e.g., 5G) wireless communication networks may require lower overhead for control information with an improved control processing timeline. Efficient techniques for transmitting control information may enable wireless communication networks to meet these stringent requirements.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide piggyback downlink control information within the physical downlink shared channel (PDSCH). A first downlink control information portion may be transmitted within the physical downlink control channel (PDCCH) and may include piggyback control information indicating at least a size of a second downlink control information portion transmitted within the PDSCH. In some examples, the piggyback control information may further indicate the code rate of the second downlink control information portion.

In one aspect of the disclosure, a method of wireless communication is provided. The method includes generating a first downlink control information portion including piggyback control information indicating at least a size of a second downlink control portion, generating the second downlink control portion including remaining control information, transmitting the first downlink control portion within a downlink control region of a slot, and transmitting the second downlink control portion within a downlink traffic region of the slot.

Another aspect of the disclosure provides a scheduling entity within a wireless communication network. The scheduling entity includes a processor, a memory communicatively coupled to the processor, and a transceiver communicatively coupled to the processor. The processor is configured to generate a first downlink control information portion including piggyback control information indicating at least a size of a second downlink control portion, generate the second downlink control portion including remaining control information, transmit the first downlink control portion within a downlink control region of a slot, and transmit the second downlink control portion within a downlink traffic region of the slot.

Another aspect of the disclosure provides a scheduling entity within a wireless communication network. The scheduling entity includes means for generating a first downlink control information portion including piggyback control information indicating at least a size of a second downlink control portion, means for generating the second downlink control portion including remaining control information, means for transmitting the first downlink control portion within a downlink control region of a slot, and means for transmitting the second downlink control portion within a downlink traffic region of the slot.

Examples of additional aspects of the disclosure follow. In some aspects of the present disclosure, the first downlink control information portion further includes initial control information for a downlink assignment in the downlink traffic region of the slot and the remaining control information includes additional control information for the downlink assignment. The initial control information may include, for example, one or more of a resource assignment, a rank, or a modulation order for the downlink assignment. The remaining control information may include, for example, one or more of hybrid automatic repeat request (HARQ) ID, redundancy version ID, new data indicator, transmit power control indicator, channel quality indicator request, sounding reference signal request, or downlink assignment index for the downlink assignment. In some examples, the second downlink control information portion further includes one or more additional downlink assignments or uplink grants for one or more subsequent slots.

In some aspects of the present disclosure, the piggyback control information further indicates a code rate of the second downlink control portion. In some aspects of the present disclosure, the second downlink control information portion may be transmitted together with user data traffic within the downlink traffic region of the slot. In some examples, each of the second downlink control information portion and the user data traffic include a same rank and modulation order. In some examples, the second downlink control information portion is rate matched with at least a portion of the user data traffic adjacent to the second downlink control information portion.

In some aspects of the present disclosure, a downlink modulation reference signal may be transmitted immediately prior to the second downlink control information portion. In some aspects of the present disclosure, the remaining control information includes a concatenation of two or more downlink control information components, each including control information for an uplink grant or a downlink assignment. In some examples, the downlink control information components are separated by respective headers.

In some aspects of the present disclosure, the second downlink control information portion may be transmitted over all resource elements within the downlink traffic region of the slot. In some aspects of the present disclosure, the first downlink control portion and the second downlink control portion carry semi-persistent scheduling information. In some examples, the second downlink control portion may be transmitted within the downlink traffic region of a subsequent slot without including the first downlink control portion within the subsequent slot.

In some aspects of the present disclosure, the initial control information includes a resource assignment commonly assigned to two or more scheduled entities. In some examples, a cyclic redundancy check of the second downlink control information portion may be scrambled with an identifier of one of the two or more scheduled entities. In some aspects of the present disclosure, the second downlink control information portion may be distributed across resource elements allocated to the second downlink control information portion within the downlink traffic region of the slot.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
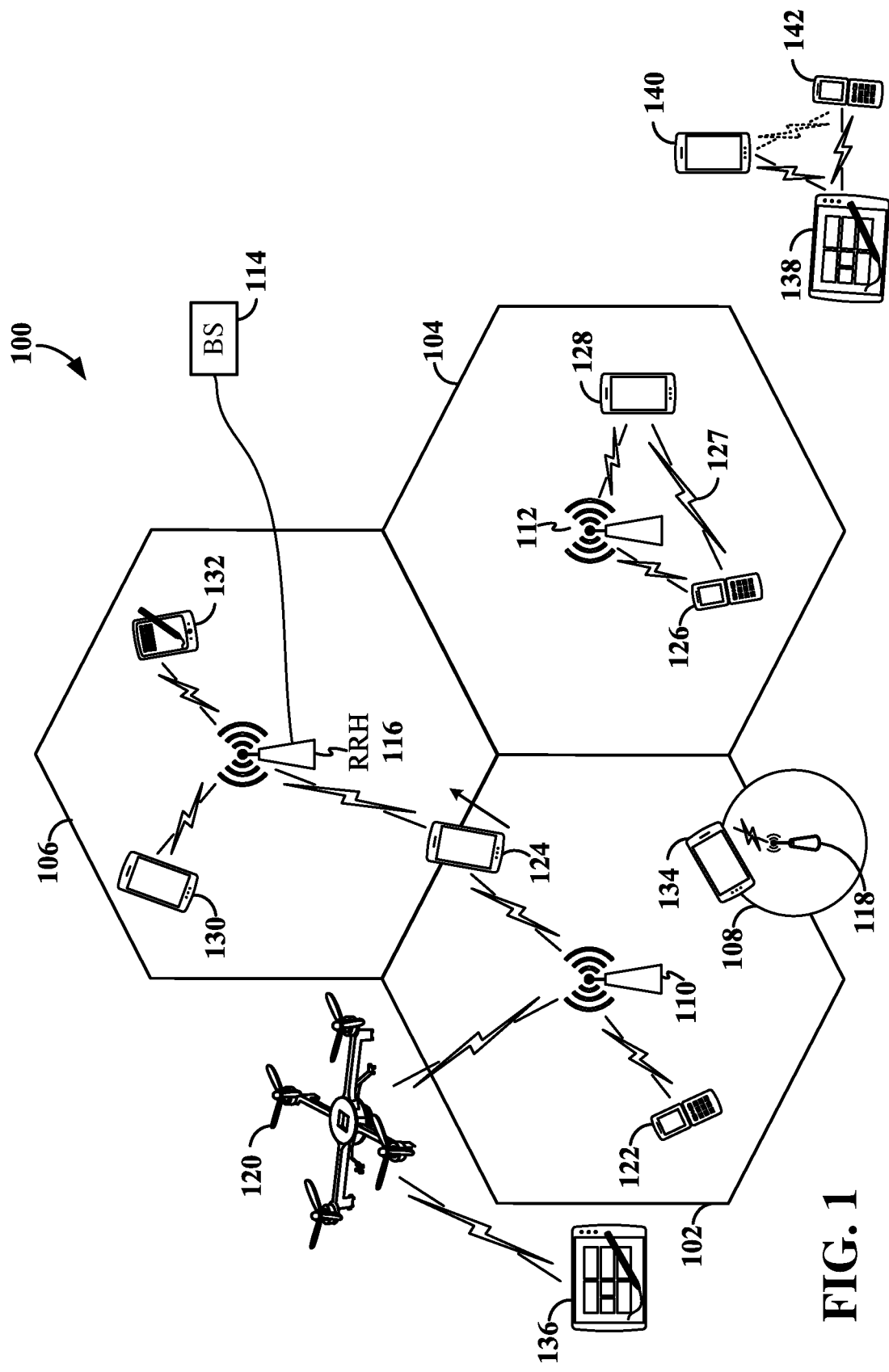
FIG. 1 is a conceptual diagram illustrating an example of an access network.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided. The access network 100 may be a legacy access network or a next generation access network. In addition, one or more nodes in the access network 100 may be next generation nodes or legacy nodes.

As used herein, the term legacy access network refers to an access network employing a third generation (3G) wireless communication technology based on a set of standards that complies with the International Mobile Telecommunications-2000 (IMT-2000) specifications or a fourth generation (4G) wireless communication technology based on a set of standards that comply with the International Mobile Telecommunications Advanced (ITU-Advanced) specification. For example, some the standards promulgated by the 3rd Generation Partnership Project (3GPP) and the 3rd Generation Partnership Project 2 (3GPP2) may comply with IMT-2000 and/or ITU-Advanced. Examples of such legacy standards defined by the 3rd Generation Partnership Project (3GPP) include, but are not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the 3rd Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

As further used herein, the term next generation access network refers to an access network employing a fifth generation (5G) wireless communication technology based on a set of standards that complies with the guidelines set forth in the 5G White Paper published by the Next Generation Mobile Networks (NGMN) Alliance on Feb. 17, 2015. For example, standards that may be defined by the 3GPP following LTE-Advanced or by the 3GPP2 following CDMA2000 may comply with the NGMN Alliance 5G White Paper.

The geographic region covered by the access network 100 may be divided into a number of cellular regions (cells) that can be uniquely identified by a user equipment (UE) based on an identification broadcasted over a geographical from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNodeB (gNB) or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service user data traffic, and/or relevant QoS for transport of critical service user data traffic.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information (e.g., user data traffic) from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), single-carrier frequency division multiple access (SC-FDMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), single-carrier frequency division multiplexing (SC-FDM) or other suitable multiplexing schemes.

Further, the air interface in the access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe/slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
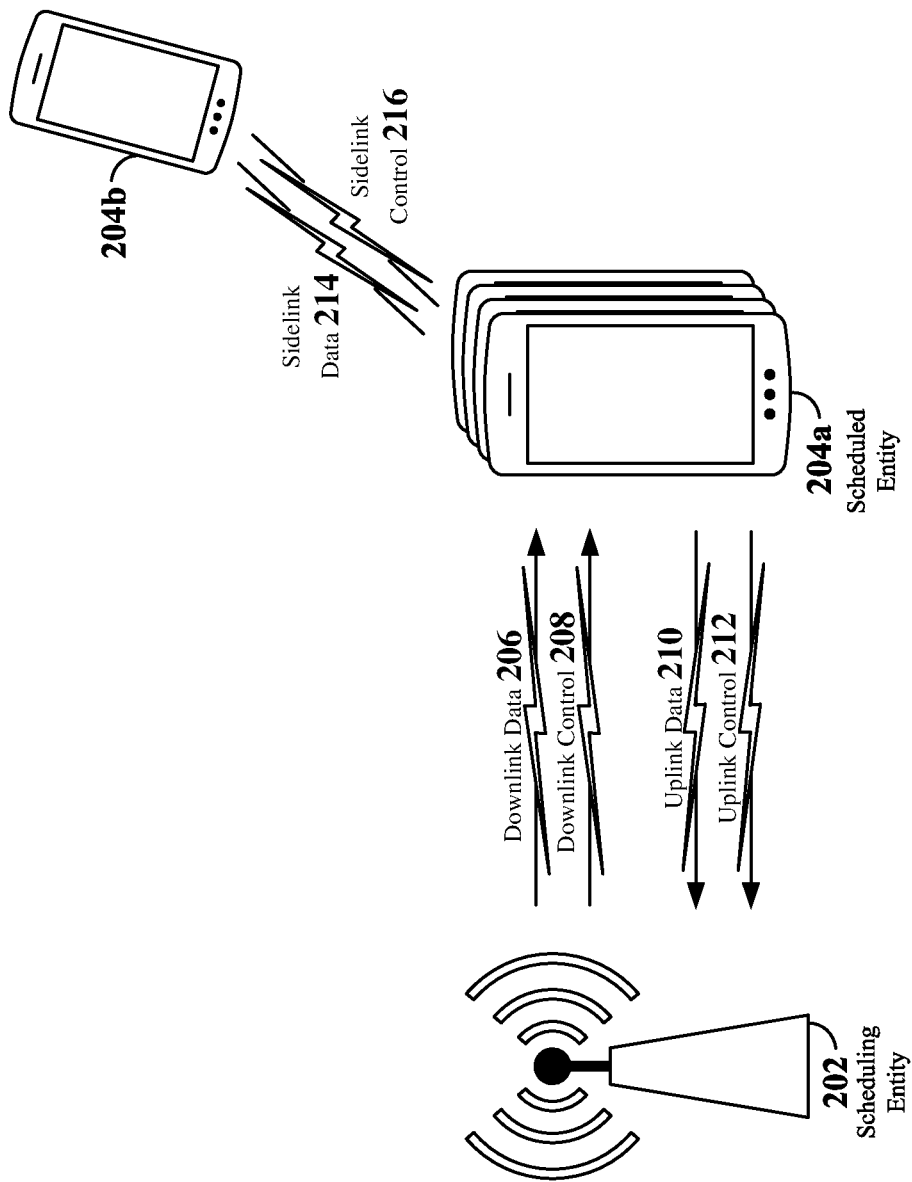
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast user data traffic 206 to one or more scheduled entities 204 (the user data traffic may be referred to as downlink user data traffic). In accordance with certain aspects of the present disclosure, the term downlink may refer to a point-to-multipoint transmission originating at the scheduling entity 202. Broadly, the scheduling entity 202 is a node or device responsible for scheduling user data traffic in a wireless communication network, including the downlink transmissions and, in some examples, uplink user data traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink user data traffic 210 and/or downlink user data traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and user data traffic information may be organized by subdividing a carrier, in time, into suitable slots.

Furthermore, the scheduled entities 204 may transmit uplink control information 212 including one or more uplink control channels (e.g., the physical uplink control channel (PUCCH)) to the scheduling entity 202. Uplink control information (UCI) transmitted within the PUCCH may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the slot for uplink packet transmissions.

Uplink and downlink transmissions may generally utilize a suitable error correcting block code. In a typical block code, an information message or sequence is split up into information blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, Walsh codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink user data traffic 214 and sidelink control 216. Sidelink control information 216 may include a source transmit signal (STS), a direction selection signal (DSS), a destination receive signal (DRS), and a physical sidelink HARQ indicator channel (PSHICH). The DSS/STS may provide for a scheduled entity 204 to request a duration of time to keep a sidelink channel available for a sidelink signal; and the DRS may provide for the scheduled entity 204 to indicate availability of the sidelink channel, e.g., for a requested duration of time. An exchange of DSS/STS and DRS (e.g., handshake) may enable different scheduled entities performing sidelink communications to negotiate the availability of the sidelink channel prior to communication of the sidelink user data traffic 214. The PSHICH may include HARQ acknowledgment information and/or a HARQ indicator from a destination device, so that the destination may acknowledge traffic received from a source device.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
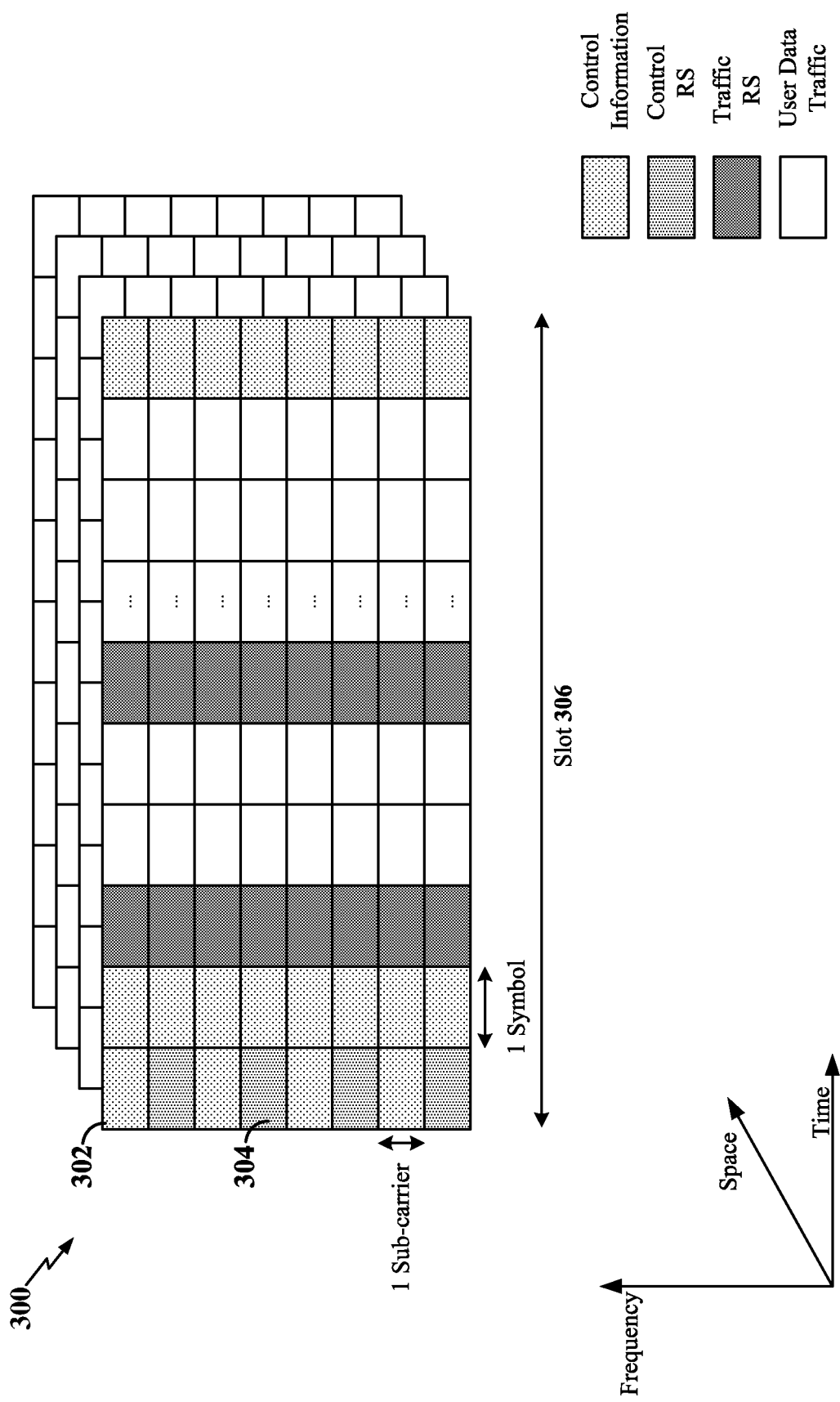
FIG. 3 is a diagram illustrating an example of a resource structure for use in an access network according to some aspects of the present disclosure.

FIG. 3 is a schematic illustration of the resource structure 300 for a radio access network, such as the RAN 100 illustrated in FIG. 1. In some examples, this illustration may represent downlink or uplink wireless resources as they may be allocated in an OFDM system that utilizes MIMO.

The resources in a wireless channel may be characterized according to three dimensions: frequency, space, and time. The frequency and time dimensions of an OFDM system may be represented by a two-dimensional grid 302 of resource elements (REs) 304. The REs 304 are defined by the separation of frequency resources into closely spaced narrowband frequency tones or sub-carriers and the separation of time resources into a sequence of OFDM symbols having a given duration. In the example shown in FIG. 3, each RE 304 is represented by a rectangle having the dimensions of one sub-carrier (e.g., 15 kHz bandwidth) by one OFDM symbol. Thus, each RE 304 represents a sub-carrier modulated for the OFDM symbol period by one OFDM data symbol. Each OFDM symbol may be modulated using, for example, quadrature phase shift keying (QPSK), 16 quadrature amplitude modulation (QAM) or 64 QAM. Further, by utilizing spatial multiplexing (e.g., with MIMO), a plurality of OFDM streams are represented by separate OFDM resource grids 302 spanning in the space dimension of FIG. 3.

The REs 304 may further be grouped into resource blocks. For example, in LTE networks, a resource block includes 12 consecutive sub-carriers in the frequency domain and, for a normal cyclic prefix in each OFDM symbol, 7 consecutive OFDM symbols in the time domain, or 84 resource elements. However, it should be understood that any suitable number of REs 304 may be grouped into a resource block.

In addition, any number of resource blocks (e.g., groups of sub-carriers and OFDM symbols) may be utilized within a subframe or slot. In the illustrated example shown in FIG. 3, the resource structure 300 represents a portion of a slot 306, which may be, for example, a downlink-centric slot or an uplink-centric slot. A DL-centric slot is referred to as a DL-centric slot because a majority (or, in some examples, a substantial portion) of the slot includes DL data. An UL-centric slot is referred to as a UL-centric slot because a majority (or, in some examples, a substantial portion) of the slot includes UL data.

In a given DL-centric or UL-centric slot 306, transmission of one or more downlink control channels may be followed by transmission of one or more downlink or uplink traffic channels, in the time dimension. In general, the first N OFDM symbols in a DL-centric slot or UL-centric slot typically correspond to a downlink control region (DL burst) of the slot that carries downlink control reference signals and downlink control information, such as the Physical Control Format Indicator Channel (PCFICH), which carries the Control Format Indicator (CFI), the Physical Hybrid Automatic Repeat Request (HARQ) Indicator Channel (PHICH), and the Physical Downlink Control Channel (PDCCH), which carries Downlink Control Information (DCI).

The PDCCH is typically transmitted over an aggregation of contiguous control channel elements (CCEs) in the downlink control region of the slot. In some examples, one CCE includes nine continuous resource element groups (REGs), where each REG includes four resource elements (REs). Thus, one CCE may include thirty-six REs.

The DCI within the PDCCH provides downlink resource assignments and/or uplink resource grants for one or more scheduled entities. Multiple PDCCHs may be transmitted each slot and each PDCCH may carry user-specific DCI or common DCI (e.g., control information broadcast to a group of scheduled entities). Each DCI may further include a cyclic redundancy check (CRC) bit that is scrambled with a radio network temporary identifier (RNTI), which may be a specific user RNTI or a group RNTI, to allow the scheduled entity to determine the type of control information sent in the PDCCH.

In the non-limiting example illustrated in FIG. 3, the first two symbols include downlink control reference signals and downlink control information, which may be the same as the control information 208 and/or 216 described above. Accordingly, these symbols may be referred to as the DL burst. Any suitable region of resources in the time, frequency, and space dimensions may be utilized as a DL burst, not necessarily limited to the first two symbols. Moreover, a DL burst need not necessarily be contiguous, and may be included in one, two, or any suitable number of separate regions.

Following the DL burst, the slot 306 may include a traffic region carrying downlink or uplink traffic reference signals and traffic information, which may be the same as the user data traffic 206, 210, and/or 214 described above. In both the DL burst and traffic region of the illustrated slot, REs that carry reference signals (RS) are interleaved with REs that carry data. These RSs can provide for channel estimation by a receiving device. In addition, one or more of the RSs in the uplink or downlink may include a demodulation reference signal (DMRS), which may be used to enable coherent signal demodulation at the receiver. In some examples, the DMRS may be transmitted from a scheduled entity to a scheduling entity at the beginning of the traffic region in an UL-centric slot to enable the scheduling entity to demodulate the subsequently transmitted uplink user data traffic.

At the end of the traffic region, the slot 306 may include an uplink (UL) burst that carries uplink control information. For example, the uplink burst may include a physical uplink control channel (PUCCH), physical random access channel (PRACH) or other suitable uplink control information. In the non-limiting example illustrated in FIG. 3, the last symbol in the slot includes the uplink control information, which may be the same as the control information 212 and/or 216 described above. While the above description only refers to the front resource grid (i.e., not considering the space dimension), it is to be understood that control and traffic information for a plurality of users may be multiplexed in space, frequency, and time.

Figure 4:
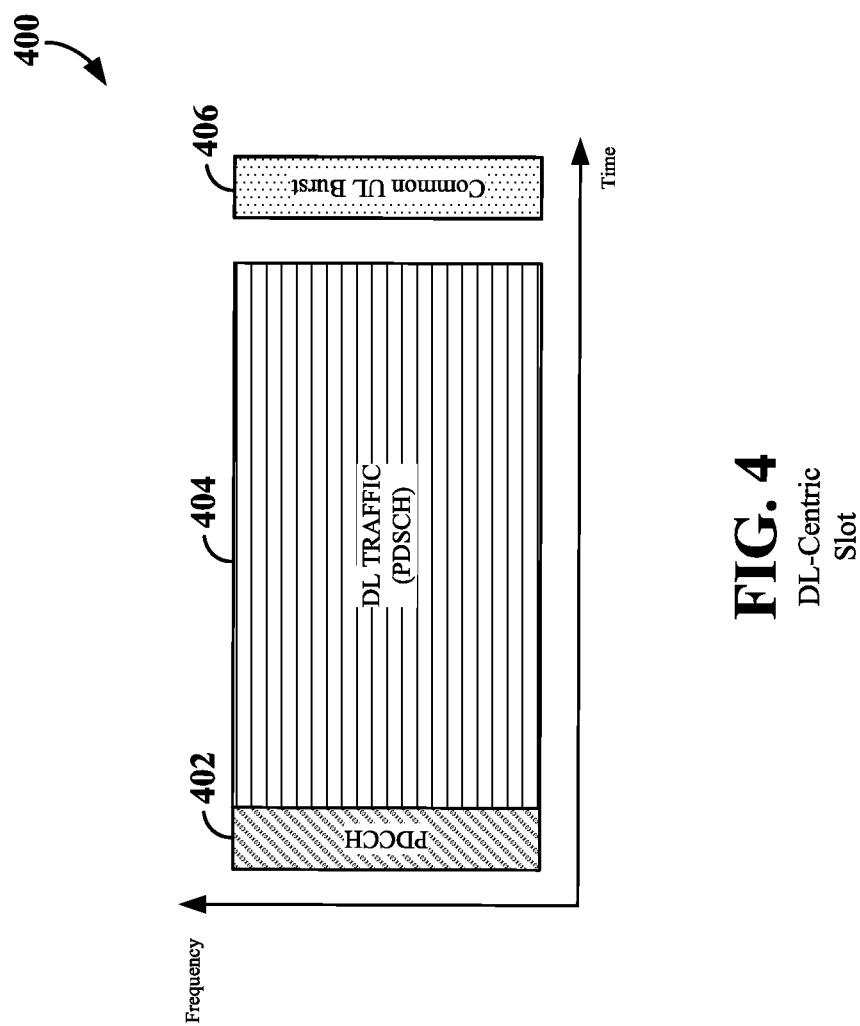
FIG. 4 is a diagram illustrating an example of a downlink (DL)-centric slot according to some aspects of the present disclosure.

FIG. 4 is a diagram illustrating an example of a downlink (DL)-centric slot 400 according to some aspects of the disclosure. In the example shown in FIG. 4, time is illustrated along a horizontal axis, while frequency is illustrated along a vertical axis. The time-frequency resources of the DL-centric slot 400 may be divided into a DL burst 402, a DL traffic region 404 and an UL burst 406.

The DL burst 402 may exist in the initial or beginning portion of the DL-centric slot. The DL burst 402 may include any suitable DL information in one or more channels. In some examples, the DL burst 402 may include various scheduling information and/or control information corresponding to various portions of the DL-centric slot. In some configurations, the DL burst 402 may be a physical DL control channel (PDCCH), as indicated in FIG. 4. The DL-centric slot may also include a DL traffic region 404. The DL traffic region 404 may sometimes be referred to as the payload of the DL-centric slot. The DL traffic region 404 may include the communication resources utilized to communicate DL user data traffic from the scheduling entity 202 (e.g., eNB) to the scheduled entity 204 (e.g., UE). In some configurations, the DL traffic region 404 may include a physical DL shared channel (PDSCH).

The UL burst 406 may include any suitable UL information in one or more channels. In some examples, the UL burst 406 may include feedback information corresponding to various other portions of the DL-centric slot. For example, the UL burst 406 may include feedback information corresponding to the control portion 402 and/or DL traffic region 404. Non-limiting examples of feedback information may include an ACK signal, a NACK signal, a HARQ indicator, and/or various other suitable types of information. The UL burst 406 may include additional or alternative information, such as information pertaining to random access channel (RACH) procedures, scheduling requests (SRs) (e.g., within a PUCCH), and various other suitable types of information.

As illustrated in FIG. 4, the end of the DL traffic region 404 may be separated in time from the beginning of the UL burst 406. This time separation may sometimes be referred to as a gap, a guard period, a guard interval, and/or various other suitable terms. This separation provides time for the switch-over from DL communication (e.g., reception operation by the scheduled entity 204 (e.g., UE)) to UL communication (e.g., transmission by the scheduled entity 204 (e.g., UE)). One of ordinary skill in the art will understand that the foregoing is merely one example of a DL-centric slot and alternative structures having similar features may exist without necessarily deviating from the aspects described herein.

In various aspects of the disclosure, to reduce control overhead and improve the processing timeline, the DCI may be split into two portions. A first DCI portion may be transmitted within the control region (e.g., DL burst 402) of the DL-centric slot 400 and a second DCI portion, referred to as a DCI piggyback, may be transmitted within the downlink traffic region 404 (e.g., within the PDSCH region) of the slot 400. The first DCI portion may include initial control information regarding a downlink assignment, such as the resource assignment, rank and modulation order of the downlink assignment. In addition, the first DCI portion may also include piggyback control information about the second DCI portion. In some examples, the piggyback control information may indicate the number of resource elements (size) and code rate of the second DCI portion. The second DCI portion may include remaining control information regarding the downlink assignment. For example, the remaining control information may include non-time critical control information, such as the HARQ process ID, redundancy version ID, a new data indicator, transmit power control indicator, channel quality indicator request, sounding reference signal request, or downlink assignment index.

Figure 5:
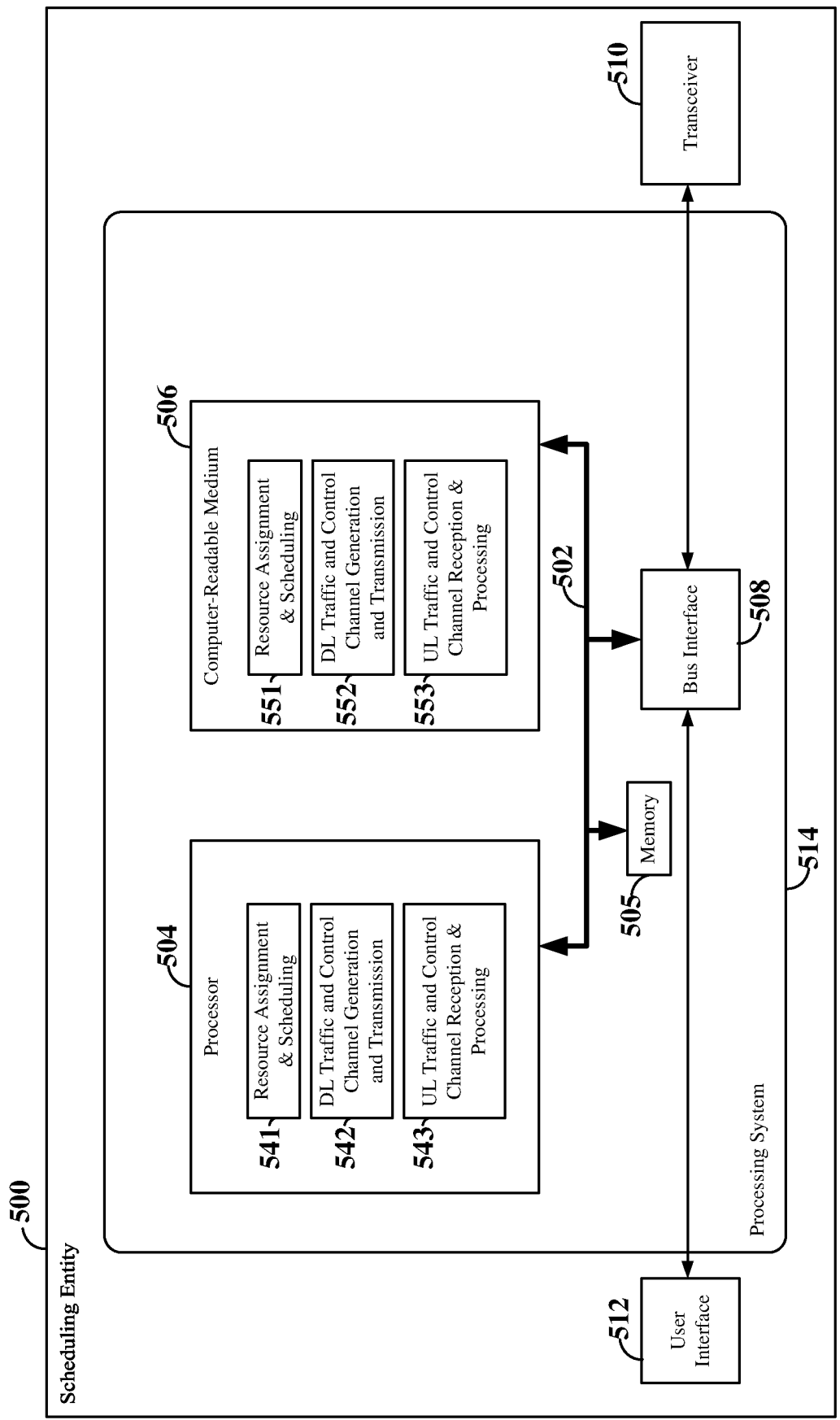
FIG. 5 is a block diagram illustrating an example of a hardware implementation for a scheduling entity employing a processing system according to some aspects of the present disclosure.

FIG. 5 is a simplified block diagram illustrating an example of a hardware implementation for a scheduling entity 500 employing a processing system 514. For example, the scheduling entity 500 may be a base station as illustrated in FIGS. 1 and/or 2. In another example, the scheduling entity 500 may be a user equipment as illustrated in FIGS. 1 and/or 2.

The scheduling entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be used to implement any one or more of the processes described below.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506.

The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 504 may include circuitry configured for various functions. For example, the processor 504 may include resource assignment and scheduling circuitry 541, configured to generate, schedule, and modify a resource assignment or grant of time-frequency resources (e.g., a set of one or more resource elements). For example, the resource assignment and scheduling circuitry 541 may schedule time-frequency resources within a plurality of time division duplex (TDD) and/or frequency division duplex (FDD) slots to carry traffic and/or control information to and/or from multiple UEs (scheduled entities). The resource assignment and scheduling circuitry 541 may further operate in coordination with resource assignment and scheduling software 551.

The processor 504 may further include downlink (DL) traffic and control channel generation and transmission circuitry 542, configured to generate and transmit downlink user data traffic and control channels within one or more slots. The DL traffic and control channel generation and transmission circuitry 542 may operate in coordination with the resource assignment and scheduling circuitry 541 to place the DL user data traffic and/or control information onto a time division duplex (TDD) or frequency division duplex (FDD) carrier by including the DL user data traffic and/or control information within one or more slots in accordance with the resources assigned to the DL user data traffic and/or control information.

For example, the DL traffic and control channel generation and transmission circuitry 542 may be configured to generate a physical downlink shared channel (PDSCH) including downlink user data traffic. The DL traffic and control channel generation and transmission circuitry 542 may further be configured to generate a physical downlink control channel (PDCCH) including downlink control information (DCI). In some examples, the DCI may include control information indicating an assignment of downlink resources for downlink user data traffic or a grant of uplink resources for one or more scheduled entities.

In various aspects of the disclosure, the DL traffic and control channel generation and transmission circuitry 542 may be configured to generate the DCI in two portions, where a first DCI portion includes initial control information regarding a downlink assignment, and a second DCI portion includes remaining control information regarding the downlink assignment. In some examples, the initial control information may include the resource assignment, rank and modulation order of the downlink assignment. In some examples, the remaining control information may include non-time critical control information, such as the HARQ process ID, redundancy version ID, a new data indicator, transmit power control indicator, channel quality indicator request, sounding reference signal request, or downlink assignment index.

In addition, the first DCI portion may also include piggyback control information providing information about the second DCI portion. In some examples, the piggyback control information may indicate the number of resource elements (size) of the second DCI portion. The piggyback control information may further indicate the location (e.g., starting resource element) and code rate of the second DCI portion. In some examples, a plurality of second DCI portion formats may be maintained, for example, in memory 505, where each format indicates a size and code rate of the second DCI portion. The DL traffic and control channel generation and transmission circuitry 542 may select one of the second DCI portion formats for a current slot based on one or more factors and may include the selected second DCI portion format information within the piggyback control information. Examples of factors that may be used to select the second DCI portion format may include, but are not limited to, the code rate of the PDSCH, reliability requirements for the control information, and the amount of control information to be included in the second DCI portion.

In some examples, the second DCI portion may further include a cyclic redundancy check (CRC) for error detection that may be scrambled with a specific user RNTI or a group RNTI. If the second DCI portion includes user-specific control information for a particular scheduled entity, the second DCI portion may be scrambled with the specific RNTI of the particular scheduled entity. If the second DCI portion includes common control information for a group of scheduled entities, the second DCI portion may be scrambled with a group RNTI to enable all of the scheduled entities within the group to decode the second DCI portion.

In some examples, the second DCI portion may further include one or more additional DCI, each containing an additional downlink assignment or uplink grant for the scheduled entity. In some examples, each DCI containing an uplink grant for the scheduled entity may correspond to a frequency division duplexed uplink grant within the duration of the same slot (e.g., an UL-centric slot frequency division duplexed with the current DL-centric slot) or a time division duplexed uplink grant within a subsequent slot (e.g., an UL-centric slot subsequent to the current DL-centric slot). In some examples, each DCI containing an additional downlink assignment for the scheduled entity may correspond a downlink assignment within a subsequent slot or may correspond to a downlink assignment that spans multiple slots (e.g., a multi-slot downlink assignment).

In some examples, the remaining control information within the second DCI portion may be a single codeword that includes a concatenation of two or more DCI components, each including control information for a downlink assignment or an uplink grant to one or more scheduled entities. Thus, each DCI component may be a separate DCI intended for one or more scheduled entities. In this example, the first DCI component may only include the piggyback control information and not include the initial control information. In some examples, the DCI components containing uplink grants may correspond to frequency division duplexed uplink grants within the duration of the same slot or time division duplexed uplink grants within subsequent slots. In some examples, the DCI components containing downlink assignments may correspond to downlink assignments within the same slot or subsequent slots or may correspond to downlink assignments that span multiple slots (e.g., a multi-slot downlink assignment).

In some examples, the DCI components may be separated by respective headers, with each header containing a UE ID type field identifying the scheduled entity or group of scheduled entities intended to receive the DCI component following the header. If all of the DCI components contain control information for a single scheduled entity, the second DCI portion may be scrambled with the RNTI of the scheduled entity. However, if the DCI components contain control information for different scheduled entities, the second DCI portion may be scrambled with a group RNTI for the multiple scheduled entities.

The DL traffic and control channel generation and transmission circuitry 542 may operate in coordination with the resource assignment and scheduling circuitry 541 to map the first DCI portion to resource elements within a downlink control region of a slot (e.g., the DL burst or PDCCH region of a DL-centric slot) and to map the second DCI portion to resource elements within a downlink traffic region of the slot (e.g., the PDSCH region of the DL-centric slot). In an aspect of the disclosure, the resource assignment and scheduling circuitry 541 may further map a demodulation reference signal (DMRS) at the beginning of the downlink traffic region of the slot and locate the second DCI portion immediately after the DMRS. Placing the second DCI portion immediately after the DMRS in time may improve the reliability of second DCI portion transmission and ensures the second DCI portion is provided near the beginning of the downlink traffic region of the slot to minimize delays in processing the data within the PDSCH.

In some examples, the resource assignment and scheduling circuitry 541 may distribute the second DCI portion across the entire bandwidth allocated to the second DCI portion to provide frequency diversity of the control information. In other examples, the resource assignment and scheduling circuitry 541 may map the second DCI portion to only a portion of the bandwidth allocated to the second DCI portion. In either case, any unused resource elements may be allocated to downlink user data traffic (e.g., the PDSCH).

In some examples, the resource assignment and scheduling circuitry 541 may transmit the second DCI portion together with downlink user data traffic (e.g., PDSCH) within the downlink traffic region of the slot. For example, the resource assignment and scheduling circuitry 541 may time division multiplex and/or frequency division multiplex the second DCI portion with downlink user data traffic within the downlink traffic region of the slot.

In other examples, the resource assignment and scheduling circuitry 541 may map the second DCI portion to the entire downlink traffic region of the slot. In this example, the PDSCH is not sent, but is instead replaced by a group of DCIs for one or more scheduled entities. Thus, the second DCI portion may be transmitted over all resource elements within the downlink traffic region of the slot. In some examples, the DCIs included in the second DCI portion may be non-time critical (e.g., uplink grants) and may include both user-specific DCI and common DCI (e.g., control information broadcast to a group of scheduled entities). If the second DCI portion includes DCIs for multiple scheduled entities, both the first and second DCI portions may be scrambled by a group radio network temporary identifier (RNTI) or a broadcast RNTI to enable all of the scheduled entities to decode the first and second DCI portions. In some examples, the first DCI portion may be scrambled by a special RNTI indicating that the entire PDSCH resource is assigned as a second DCI portion. As indicated above, the second DCI portion may include headers separating each of the individual DCIs for addressing to specific scheduled entities or groups of scheduled entities. In some examples, the first DCI portion may be included within a common search space for the PDCCH and may simply grant the entire PDSCH region for control information. Thus, the first DCI portion may not include the initial control information (e.g., may not include a specific downlink assignment to one or more scheduled entities).

In some examples, the DL traffic and control channel generation and transmission circuitry 542 may perform coding of the second DCI portion separately from the first DCI portion and from the PDSCH. In some examples, the code rate of the second DCI portion may be set separately from the code rate of the PDSCH to target a lower block error rate (BLER) for more reliable delivery of the control information. In other examples, at least a portion of the data within the PDSCH may be rate matched to the second DCI portion. For example, data resource elements frequency division multiplexed with the second DCI portion may be rate matched to the second DCI portion.

In some examples, the second DCI portion may have the same rank and modulation order as the PDSCH to enable a single demapper to be utilized by the scheduled entity for both the PDSCH and the second DCI portion. In other examples, the second DCI portion may utilize a different rank and modulation order than the PDSCH, which may require separate demappers at the scheduled entity for the PDSCH and second DCI portion. For example, a rank of one may be utilized for the second DCI portion, while a rank of two or greater may be utilized for the PDSCH. As used herein, the term rank refers to the number of layers or data streams used by the scheduling entity 500 to transmit information (e.g., control and/or data) to the scheduled entity. As further used herein, the term modulation order refers to the modulation depth of the modulation scheme (e.g., QPSK, 16 QAM, 64 QAM, etc.) used by the scheduling entity to modulate information (e.g., control and/or data) onto the allocated subcarriers.

In some examples, the first and second DCI portions may provide semi-persistent scheduling (SPS) of downlink assignments or uplink grants to scheduled entities. For example, the first DCI portion may include one or more SPS configuration parameters, such as the resource assignment for the SPS downlink assignment or uplink grant, an SPS identifier (e.g., an SPS-RNTI) for the scheduled entity and a periodicity of the SPS assignment/grant. The first DCI portion may further include the piggyback control information providing information about the second DCI portion. The second DCI portion may include non-time critical control information and additional SPS configuration parameters, such as an implicit release time, cyclic shift DMRS configuration, and/or other parameters. Since the SPS configuration information configures the scheduled entity with a periodicity of downlink assignments or uplink grants, at least the first DCI portion need not be repeated in subsequent subframes.

In some examples, the DL traffic and control channel generation and transmission circuitry 542 may generate multiple first DCI portions, each providing information regarding a single second DCI portion. Each first DCI portion may be transmitted to a different scheduled entity, and the DL traffic and control channel generation and transmission circuitry 542 may select one of the scheduled entities to receive the second DCI portion by scrambling the second DCI portion with the RNTI of the selected scheduled entity. For example, the DL traffic and control channel generation and transmission circuitry 542 may select a particular scheduled entity for the downlink assignment based on the priorities of the scheduled entities. In some examples, the DL traffic and control channel generation and transmission circuitry 542 in coordination with the resource assignment and scheduling circuitry 541 may transmit the DMRS for the selected scheduled entity followed by the second DCI portion scrambled with the RNTI of the selected scheduled entity in the downlink traffic region of the slot.

Such overbooking of resource elements may be used to support multi-user multiple input multiple output (MU-MIMO) transmissions (e.g., by scheduling multiple users and then canceling transmissions to one or more users) or SPS assignments/grants shared among multiple scheduled entities. For example, the second DCI portion may be included in each slot for which an SPS transmission is scheduled and the piggyback control information in the first DCI portions may contain information about the second DCI portion for each slot (e.g., the size and location of the second DCI portion may remain constant between slots). In each SPS slot, the second DCI portion may be scrambled with the RNTI of the scheduled entity selected to utilize the SPS assignment/grant in that slot. The DL traffic and control channel generation and transmission circuitry 542 may further operate in coordination with DL traffic and control channel generation and transmission software 552.

The processor 504 may further include uplink (UL) traffic and control channel reception and processing circuitry 543, configured to receive and process uplink control channels and uplink traffic channels from one or more scheduled entities. For example, the UL traffic and control channel reception and processing circuitry 543 may be configured to receive a scheduling request from a scheduled entity. The UL traffic and control channel reception and processing circuitry 543 may further be configured to provide the scheduling request to the resource assignment and scheduling circuitry 541 for processing. The UL traffic and control channel reception and processing circuitry 543 may further be configured to receive uplink user data traffic from one or more scheduled entities. In general, the UL traffic and control channel reception and processing circuitry 543 may operate in coordination with the resource assignment and scheduling circuitry 541 to schedule UL user data traffic transmissions, DL user data traffic transmissions and/or DL user data traffic retransmissions in accordance with the received UL control information. The UL traffic and control channel reception and processing circuitry 543 may further operate in coordination with UL traffic and control channel reception and processing software 553.

Figure 6:
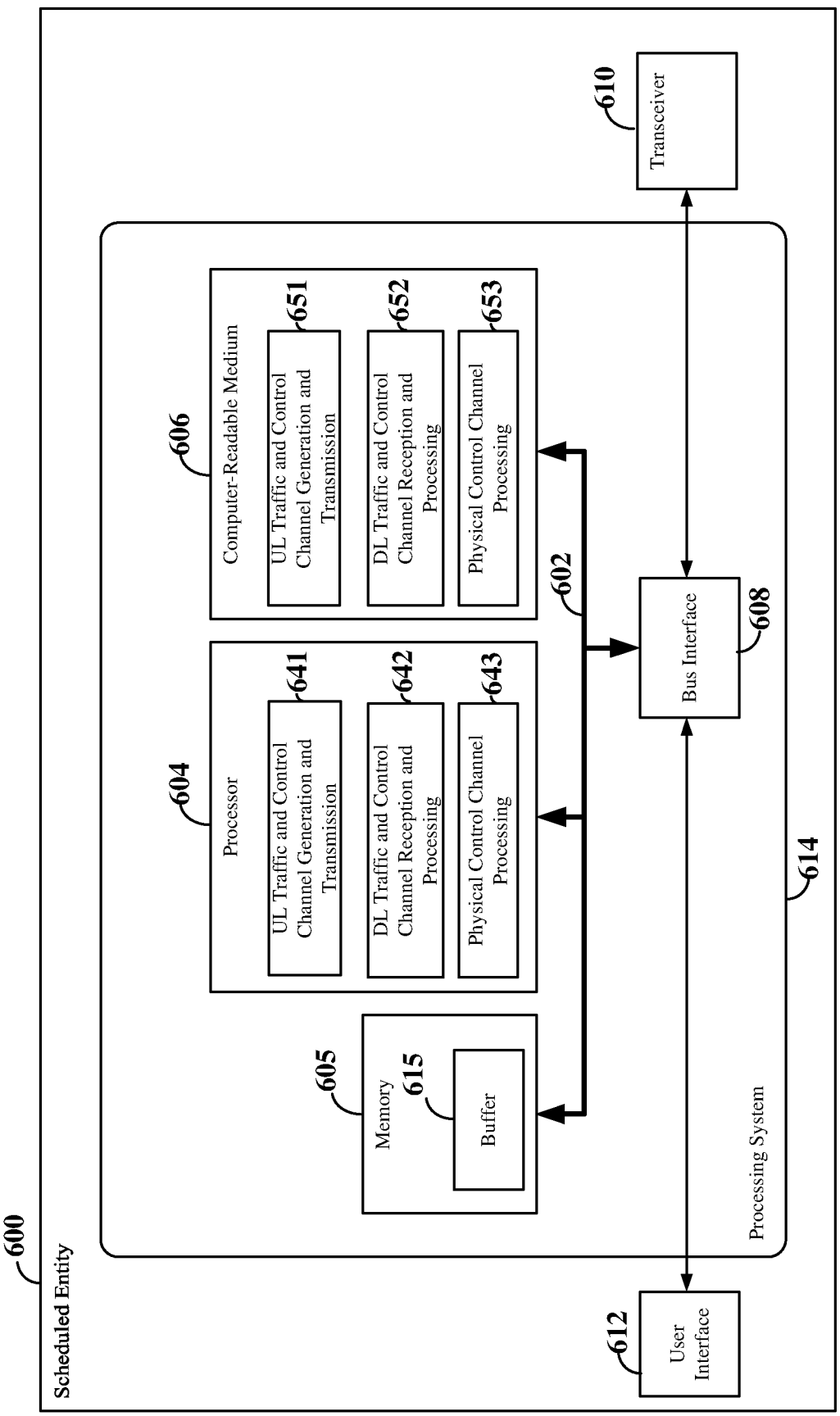
FIG. 6 is a block diagram illustrating an example of a hardware implementation for a scheduled entity employing a processing system according to some aspects of the present disclosure.

FIG. 6 is a conceptual diagram illustrating an example of a hardware implementation for an exemplary scheduled entity 600 employing a processing system 614. In accordance with various aspects of the disclosure, an element, or any portion of an element, or any combination of elements may be implemented with a processing system 614 that includes one or more processors 604. For example, the scheduled entity 600 may be a user equipment (UE) as illustrated in any one or more of FIGS. 1 and 2.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be used to implement any one or more of the processes described below.

In some aspects of the disclosure, the processor 604 may include uplink (UL) traffic and control channel generation and transmission circuitry 641, configured to generate and transmit uplink control/feedback/acknowledgement information on an UL control channel. For example, the UL traffic and control channel generation and transmission circuitry 641 may be configured to generate and transmit an uplink control channel (e.g., a Physical Uplink Control Channel (PUCCH)). The UL traffic and control channel generation and transmission circuitry 641 may further be configured to generate and transmit uplink user data traffic on an UL traffic channel (e.g., a PUSCH) in accordance with an uplink grant. The UL traffic and control channel generation and transmission circuitry 641 may operate in coordination with UL traffic and control channel generation and transmission software 651.

The processor 604 may further include downlink (DL) traffic and control channel reception and processing circuitry 642, configured for receiving and processing downlink user data traffic on a traffic channel, and to receive and process control information on one or more downlink control channels. For example, the DL traffic and control channel reception and processing circuitry 642 may be configured to receive a Physical Downlink Control Channel (PDCCH) and a Physical Downlink Shared Channel (PDSCH) within a current slot (e.g., a DL-centric slot). In some examples, received downlink user data traffic and/or control information may be temporarily stored in a data buffer 615 within memory 605. The DL traffic and control channel reception and processing circuitry 642 may operate in coordination with DL traffic and control channel reception and processing software 652.

The processor 604 may further include physical control channel processing circuitry 643, configured to process DCI split between the PDCCH and PDSCH within a current slot (e.g., a DL-centric slot). In various aspects of the disclosure, the physical control channel processing circuitry 643 may be configured to identify a search space within a control section of the current slot and perform blind decoding of a first DCI portion within the search space. Based on the first DCI portion, the physical control channel processing circuitry 643 may identify resource elements within a downlink traffic region of the slot (e.g., within the PDSCH region) carrying a second DCI portion and decode the second DCI portion. For example, the first DCI portion may include piggyback control information indicating the size (e.g., number of resource elements) of the second DCI portion, location (e.g., starting resource element) of the second DCI portion and code rate of the second DCI portion.

The first DCI portion may further include initial control information regarding a downlink assignment for the scheduled entity (or group of scheduled entities including the scheduled entity 600), such as the resource assignment, rank and modulation order of the downlink assignment. The second DCI portion may include remaining control information regarding the downlink assignment. For example, the remaining control information may include non-time critical control information, such as the HARQ process ID, redundancy version ID, a new data indicator, transmit power control indicator, channel quality indicator request, sounding reference signal request, or downlink assignment index. Thus, the DL traffic and control channel reception and processing circuitry 642 may utilize the first DCI portion to identify user data traffic within the PDSCH to be decoded and may buffer the user data traffic (e.g., within buffer 615) while the second DCI portion is decoded.

In some examples, the second DCI portion may have the same rank and modulation order as the user data traffic within the PDSCH to enable the DL traffic and control channel reception and processing circuitry 642 and physical control channel processing circuitry 643 to utilize a single demapper for both the PDSCH and the second DCI portion. In other examples, the second DCI portion may utilize a different rank and modulation order than the PDSCH, which may require the DL traffic and control channel reception and processing circuitry 642 and physical control channel processing circuitry 643 to utilize separate demappers for the PDSCH and second DCI portion. The second DCI portion further have the same code rate as the surrounding data within the PDSCH. For example, the second DCI portion may have the same code rate as at least the user data traffic that may be frequency division multiplexed with the second DCI portion. In some examples, the second DCI portion may be located immediately after the DMRS within the slot to improve reliability of the second DCI portion.

In some examples, the second DCI portion may further include one or more additional DCI, each containing an additional downlink assignment or uplink grant for the scheduled entity 600. In some examples, each DCI containing an uplink grant for the scheduled entity may correspond to a frequency division duplexed uplink grant within the duration of the current slot or a time division duplexed uplink grant within a subsequent slot. In some examples, each DCI containing an additional downlink assignment for the scheduled entity may correspond a downlink assignment within a subsequent slot or may correspond to a downlink assignment that spans multiple slots (e.g., a multi-slot downlink assignment).

In some examples, the second DCI portion may be a single codeword that includes a concatenation of two or more DCI components, each including control information for a downlink assignment or an uplink grant to at least the scheduled entity 600. Thus, each DCI component may be a separate DCI intended for one or more scheduled entities. In this example, the first DCI portion may only include the piggyback control information and not the initial control information. In some examples, the DCI components containing uplink grants may correspond to frequency division duplexed uplink grants within the duration of the current slot or time division duplexed uplink grants within subsequent slots. In some examples, the DCI components containing downlink assignments may correspond to downlink assignments within the same slot or subsequent slots or may correspond to downlink assignments that span multiple slots (e.g., a multi-slot downlink assignment). In some examples, the DCI components may be separated by respective headers, with each header containing a UE ID field type identifying the scheduled entity or group of scheduled entities intended to receive the DCI component following the header.

If all of the DCI components contain control information for the scheduled entity, the second DCI portion may be scrambled with the RNTI of the scheduled entity and the physical control channel processing circuitry 643 may decode the DCI components utilizing the RNTI of the scheduled entity 600. However, if the DCI components contain control information for different scheduled entities, the second DCI portion may be scrambled with a group RNTI for the multiple scheduled entities. Thus, the physical control channel processing circuitry 643 may decode all of the DCI components using the group RNTI and then utilize the headers to identify which DCI components are intended for the scheduled entity 600.

In some examples, the second DCI portion may occupy the entire downlink traffic region of the slot. In this example, the PDSCH is not received, but is instead replaced by a group of DCIs for one or more scheduled entities. Thus, the second DCI portion may be received across all resource elements within the downlink traffic region of the slot. In some examples, the DCIs included in the second DCI portion may be non-time critical (e.g., uplink grants) and may include both user-specific DCI and common DCI (e.g., control information broadcast to a group of scheduled entities). If the second DCI portion includes DCIs for multiple scheduled entities, both the first and second DCI portions may be scrambled by a group radio network temporary identifier (RNTI) or a broadcast RNTI to enable all of the scheduled entities to decode the first and second DCI portions. As indicated above, the second DCI portion may include headers separating each of the individual DCIs for addressing to specific scheduled entities or groups of scheduled entities. In some examples, the first DCI portion may be included within a common search space for the PDCCH and may simply grant the entire PDSCH region for control information. Thus, the first DCI portion may not include the initial control information (e.g., may not include a specific downlink assignment or uplink grant to one or more scheduled entities).

In some examples, the first and second DCI portions may provide semi-persistent scheduling (SPS) of a downlink assignment or uplink grant to the scheduled entity 600. For example, the first DCI portion may include one or more SPS configuration parameters, such as the resource assignment for the SPS downlink assignment or uplink grant, an SPS identifier (e.g., an SPS-RNTI) for the scheduled entity and a periodicity of the SPS assignment/grant. The first DCI portion may further include the piggyback control information providing information about the second DCI portion. The second DCI portion may include non-time critical control information and additional SPS configuration parameters, such as an implicit release time, cyclic shift DMRS configuration, and/or other parameters. Since the SPS configuration information configures the scheduled entity 600 with a periodicity of downlink assignments or uplink grants, subsequent slots within which the scheduled entity 600 has an SPS assignment/grant may not include at least the first DCI portion.

In some examples, the slot may include multiple first DCI portions, each intended for a different scheduled entity and each providing piggyback control information regarding a single second DCI portion. The second DCI portion may then be scrambled with the RNTI of a selected scheduled entity. If the physical control channel processing circuitry 643 is able to decode the second DCI portion using the RNTI of the scheduled entity 600, the physical control channel processing circuitry 643 will process the second DCI portion to obtain remaining control information regarding a downlink assignment. However, if the physical control channel processing circuitry 643 is unable to decode the second DCI portion (e.g., the CRC computation fails), the physical control channel processing circuitry 643 will assume the downlink assignment has been canceled. The physical control channel processing circuitry 643 may operate in coordination with physical control channel processing software 653.

Figure 7:
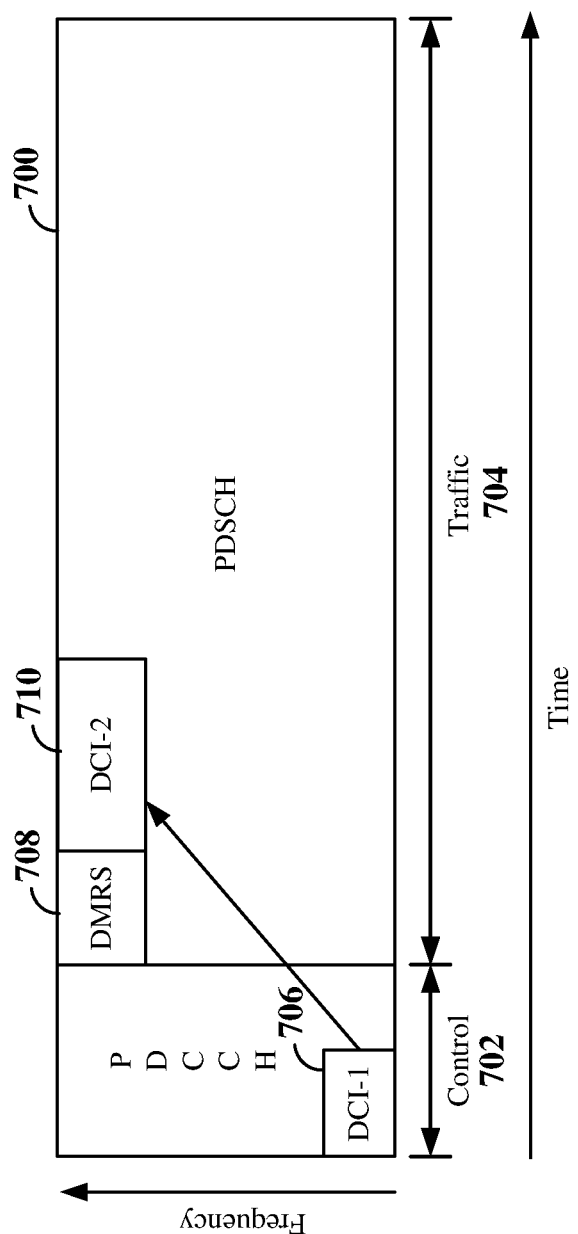
FIG. 7 is a diagram illustrating an example of a time-frequency representation of a slot containing a DCI piggyback in the physical downlink shared channel (PDSCH) according to some aspects of the present disclosure.

FIG. 7 is a diagram illustrating an example of a time-frequency representation of a slot 700 containing a DCI piggyback in the physical downlink shared channel (PDSCH) according to some aspects of the present disclosure. In the example shown in FIG. 7, time is illustrated along a horizontal axis, while frequency is illustrated along a vertical axis. The time-frequency resource elements of the slot 700 may be divided into a control region 702 and a downlink traffic region 704. In some examples, the slot 700 is a DL-centric slot and the control region 702 is a DL burst of the DL-centric slot. Within the DL burst 702, various control information, including a physical downlink control channel (PDCCH) carrying downlink control information (DCI) for one or more scheduled entities, may be transmitted. Within the downlink traffic region 704, a physical downlink shared channel (PDSCH) carrying user data traffic for one or more scheduled entities may be transmitted. Although not illustrated, the slot 700 may further include an UL burst after the PDSCH 704.

In various aspects of the disclosure, the DCI of a PDCCH may be split into a first DCI control portion (DCI-1) 706 and a second control portion (DCI-2) 710. DCI-1 706 may be transmitted within the DL burst 702 of the slot 700, while DCI-2 may be transmitted within the downlink traffic region 704 of the slot 700. Thus, DCI-2 710 may be time division multiplexed and/or frequency division multiplexed with downlink user data traffic within the downlink traffic region 704 of the slot 700. DCI-1 706 may include, for example, initial control information regarding a downlink assignment, while DCI-2 710 may include, for example, remaining control information regarding the downlink assignment. In some examples, the initial control information may include the resource assignment, rank and modulation order of the downlink assignment. In some examples, the remaining control information may include non-time critical control information, such as the HARQ process ID, redundancy version ID, a new data indicator, transmit power control indicator, channel quality indicator request, sounding reference signal request, or downlink assignment index.

In addition, DCI-1 706 may also include piggyback control information providing information about DCI-2 710. In some examples, the piggyback control information may indicate the number of resource elements (size) of the DCI-2 710. The piggyback control information may further indicate the location (e.g., starting resource element) and code rate of the DCI-2 710. Thus, DCI-1 706 within the DL burst 702 of the slot 700 may point to DCI-2 710 within the downlink traffic region 704 of the slot 700.

In some examples, the code rate of the DCI-2 710 may be set separately from the code rate of the PDSCH to target a lower block error rate (BLER) for more reliable delivery of the control information. In other examples, at least a portion of the user data traffic within the PDSCH may be rate matched to the DCI-2 710. For example, user data traffic resource elements frequency division multiplexed with the DCI-2 710 may be rate matched to the DCI-2 710. In some examples, the DCI-2 710 may have the same rank and modulation order as the PDSCH to enable a single demapper to be utilized by the scheduled entity for both the PDSCH and the DCI-2 710. In other examples, the DCI-2 710 may utilize a different rank and modulation order than the PDSCH, which may require separate demappers at the scheduled entity for the PDSCH and DCI-2 710.

In the example shown in FIG. 7, a demodulation reference signal (DMRS) 708 for the scheduled entity associated with DCI-2 710 is further transmitted at the beginning of the downlink traffic region 704 of the slot 700 and the DCI-2 710 is transmitted immediately after the DMRS 708. Placing the DCI-2 710 immediately after the DMRS 708 in time may improve the reliability of the transmission of the DCI-2 710 and ensures the DCI-2 is received near the beginning of the downlink traffic region 704 of the slot 700 to minimize delays in processing the user data traffic within the PDSCH.

Figure 8:
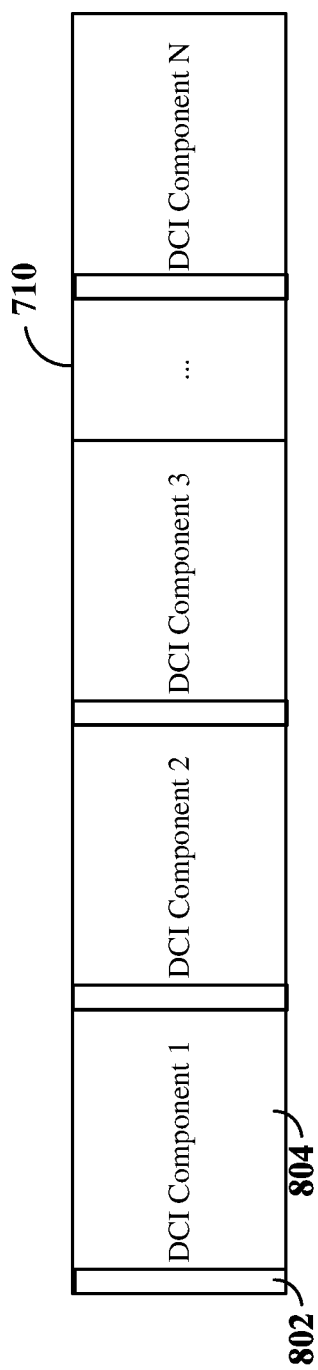
FIG. 8 is a diagram illustrating an example of a second DCI portion carrying control information according to some aspects of the present disclosure.

FIG. 8 is a diagram illustrating an example of a second DCI portion (DCI-2) 710 carrying control information. As shown in FIG. 8, the second DCI portion 710 may be a single codeword that includes a concatenation of a plurality of downlink channel information (DCI) components 804 (e.g., DCI Component 1 . . . DCI Component N). Each DCI Component 804 may include scheduling assignments (e.g., downlink assignments and/or uplink grants) for one or more scheduled entities. Thus, each DCI component 804 is a separate DCI intended for one or more scheduled entities. In some examples, the DCI components 804 containing uplink grants may correspond to frequency division duplexed uplink grants within the duration of the current slot or time division duplexed uplink grants within subsequent slots. In some examples, the DCI components 804 containing downlink assignments may correspond to downlink assignments within the same current slot or subsequent slots or may correspond to downlink assignments that span multiple slots (e.g., a multi-slot downlink assignment). As shown in FIG. 8, the DCI components 804 may be separated by respective headers 802, with each header containing a UE ID type field identifying the scheduled entity or group of scheduled entities intended to receive the DCI component 804 following the header 802.

If all of the DCI components 804 contain control information for a single scheduled entity, the CRC bits (not shown) of the second DCI portion 710 may be scrambled with the RNTI of the scheduled entity. However, if the DCI components 804 contain control information for different scheduled entities, the CRC bits of the second DCI portion 710 may be scrambled with a group RNTI for the multiple scheduled entities.

Figure 9:
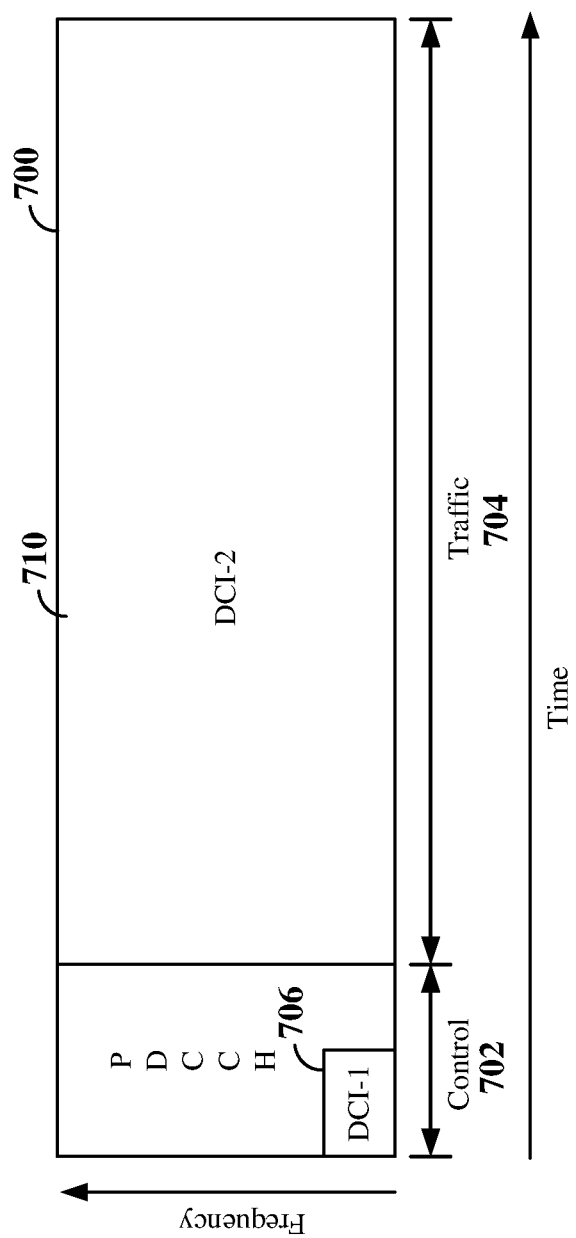
FIG. 9 is a diagram illustrating an example of a time-frequency representation of a slot containing a DCI piggyback occupying the entire downlink traffic region of the slot according to some aspects of the present disclosure.

FIG. 9 is a diagram illustrating an example of a time-frequency representation of a slot 700 containing a DCI piggyback occupying the entire downlink traffic region of the slot according to some embodiments. In the example shown in FIG. 9, the DCI-2 710 is transmitted within the entire downlink traffic region 704 of the slot 700. Thus, the PDSCH is not included in the slot 700, but is instead replaced by a group of DCIs for one or more scheduled entities. As such, the DCI-2 710 may be transmitted across all time-frequency resource elements within the downlink traffic region 704 of the slot 700.

In some examples, if the second DCI portion includes DCIs for multiple scheduled entities, both the DCI-1 706 transmitted within the control region 702 (e.g., DL burst) and DCI-2 710 transmitted within the downlink traffic region 704 of the slot 700 may be scrambled by a group radio network temporary identifier (RNTI) or a broadcast RNTI to enable all of the scheduled entities to decode the first and second DCI portions. As shown and described above in connection with FIG. 8, the DCI-2 710 may include headers separating each of the individual DCIs for addressing to specific scheduled entities or groups of scheduled entities.

Figure 10:
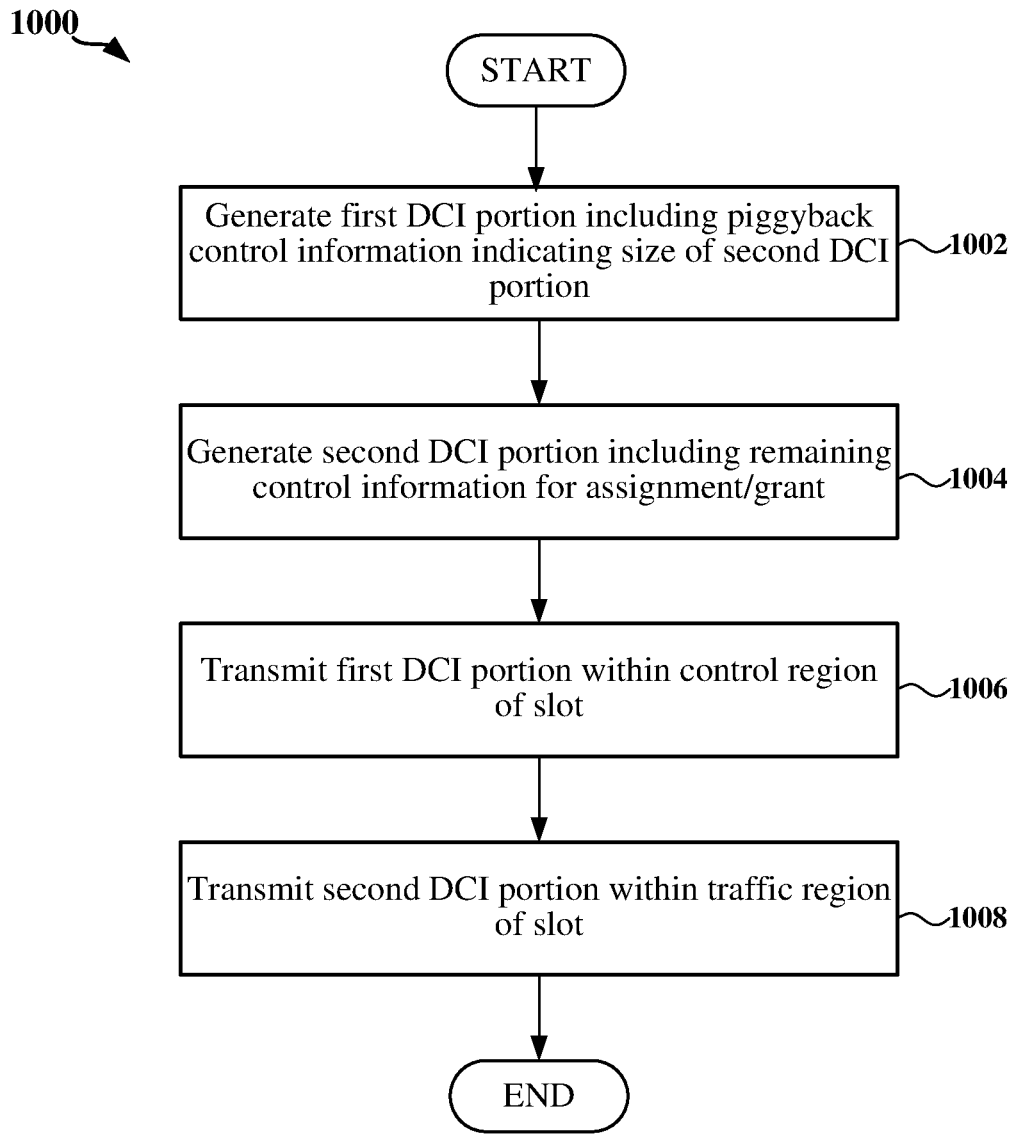
FIG. 10 is a flow chart illustrating a process for wireless communication utilizing a downlink control information (DCI) piggyback in the downlink traffic region of a slot according to some aspects of the present disclosure.

FIG. 10 is a flow chart illustrating a process 1000 for wireless communication utilizing a downlink control information (DCI) piggyback in the downlink traffic region of a slot according to an aspect of the disclosure. As described below, some or all illustrated features may be omitted in a particular implementation within the scope of the present disclosure, and some illustrated features may not be required for implementation of all embodiments. In some examples, the process 1000 may be carried out by the scheduling entity illustrated in FIG. 5. In some examples, the process 1000 may be carried out by any suitable apparatus or means for carrying out the functions or algorithm described below.

At block 1002, the scheduling entity may generate a first downlink control information (DCI) portion including piggyback control information indicating at least a size of a second DCI portion. The first DCI portion may further include initial control information regarding a downlink assignment. For example, the initial control information may include the resource assignment (e.g., time-frequency resources allocated for the downlink assignment), the rank, and the modulation order for the downlink assignment. For example, the DL traffic and control channel generation and transmission circuitry 542 shown and described above in connection with FIG. 5 may generate the first DCI portion.

At block 1004, the scheduling entity may generate a second DCI portion including remaining control information regarding the downlink assignment. The remaining control information may include, for example, non-time critical control information, such as the HARQ process ID, redundancy version ID, new data indicator, transmit power control indicator, channel quality indicator request, sounding reference signal request, or downlink assignment index. For example, the DL traffic and control channel generation and transmission circuitry 542 shown and described above in connection with FIG. 5 may generate the second DCI portion.

At block 1006, the scheduling entity may transmit the first DCI portion within a control region (e.g., a PDCCH region or DL burst) of a current slot (e.g., a DL-centric slot). At block 1008, the scheduling entity may further transmit the second DCI portion within a downlink traffic region (e.g., PDSCH) of the current slot. In some examples, the second DCI portion may be time division multiplexed and/or frequency division multiplexed with user data traffic within the downlink traffic region of the slot. In other examples, the second DCI portion may occupy all of the time-frequency resources of the downlink traffic region of the slot. For example, the second DCI portion may include a concatenation of a plurality of DCI components, each providing a downlink assignment or an uplink grant for one or more scheduled entities. In some examples, the second DCI portion may be transmitted with the same rank and modulation order as the PDSCH. In addition, the second DCI portion may be rate matched to at least the user data traffic surrounding the second DCI portion. In some examples, the second DCI portion may be transmitted immediately after a demodulation reference signal (DMRS) to improve reliability of transmission of the second DCI portion. For example, the resource assignment and scheduling circuitry 541 in coordination with the DL traffic and control channel generation and transmission circuitry 542 shown and described above in connection with FIG. 5 may transmit a slot containing the first DCI portion within a control region thereof and the second DCI portion within a downlink traffic region thereof.

Figure 11:
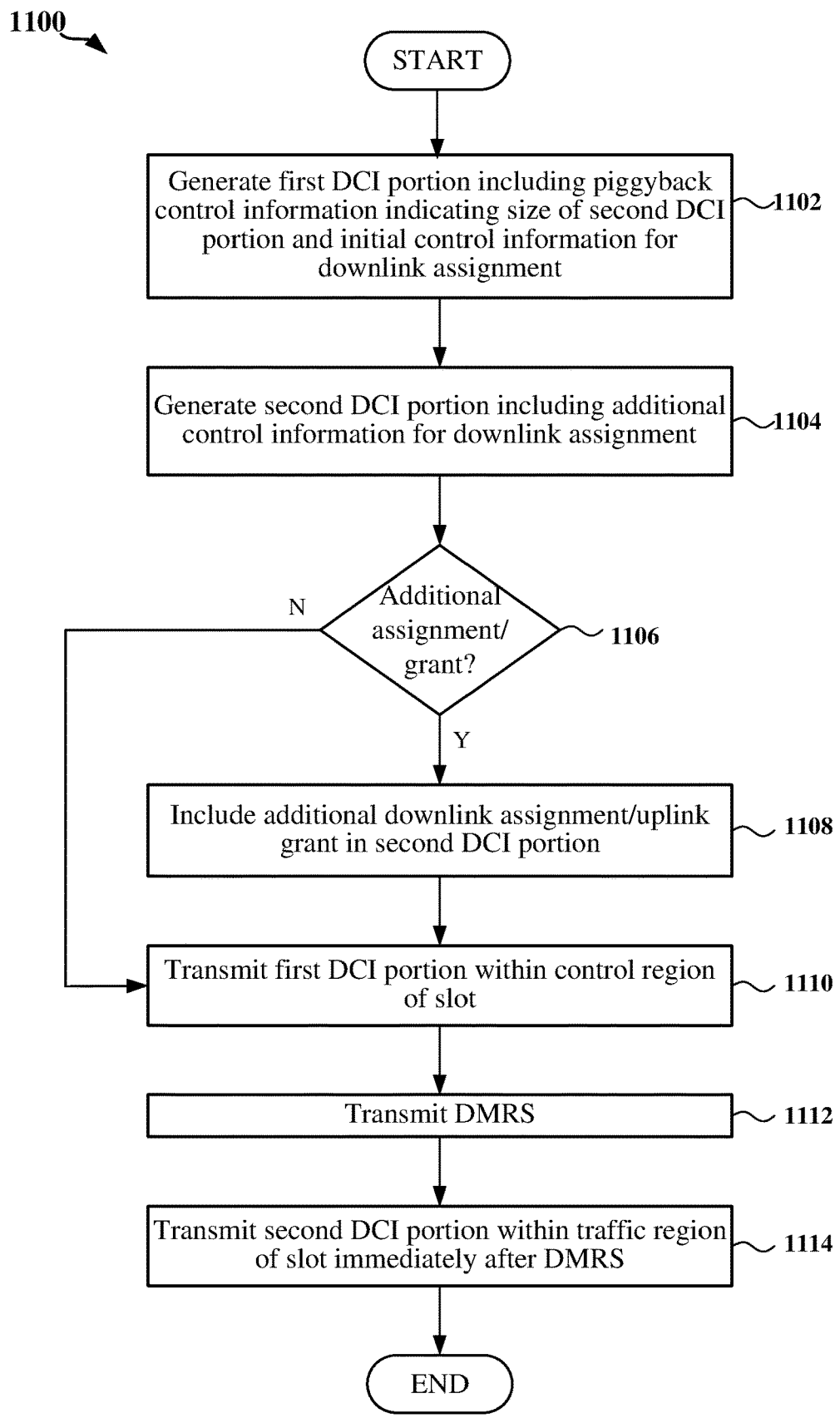
FIG. 11 is a flow chart illustrating another process for wireless communication utilizing a downlink control information (DCI) piggyback in the downlink traffic region of a slot according to an aspect of the disclosure.

FIG. 11 is a flow chart illustrating another process 1100 for wireless communication utilizing a downlink control information (DCI) piggyback in the downlink traffic region of a slot according to an aspect of the disclosure. As described below, some or all illustrated features may be omitted in a particular implementation within the scope of the present disclosure, and some illustrated features may not be required for implementation of all embodiments. In some examples, the process 1100 may be carried out by the scheduling entity illustrated in FIG. 5. In some examples, the process 1100 may be carried out by any suitable apparatus or means for carrying out the functions or algorithm described below.

At block 1102, the scheduling entity may generate a first downlink control information (DCI) portion including piggyback control information indicating at least a size of a second DCI portion. The first DCI portion may further include initial control information regarding a downlink assignment. For example, the initial control information may include the resource assignment (e.g., time-frequency resources allocated for the downlink assignment), the rank, and the modulation order for the downlink assignment. For example, the DL traffic and control channel generation and transmission circuitry 542 shown and described above in connection with FIG. 5 may generate the first DCI portion.

At block 1104, the scheduling entity may generate a second DCI portion including additional control information regarding the downlink assignment. The additional control information may include, for example, non-time critical control information, such as the HARQ process ID, redundancy version ID, new data indicator, transmit power control indicator, channel quality indicator request, sounding reference signal request, or downlink assignment index. For example, the DL traffic and control channel generation and transmission circuitry 542 shown and described above in connection with FIG. 5 may generate the second DCI portion.

At block 1106, the scheduling entity may determine whether an additional downlink assignment or uplink grant is available for one or more scheduled entities. If an additional downlink assignment or uplink grant is available (Y branch of block 1106), at block 1108, the scheduling entity may include the additional downlink assignment or uplink grant in the second DCI portion. For example, the DL traffic and control channel generation and transmission circuitry 542 shown and described above in connection with FIG. 5 may include an additional downlink assignment or uplink grant in the second DCI portion.

At block 1110, the scheduling entity may transmit the first DCI portion within a control region (e.g., a PDCCH region or DL burst) of a current slot (e.g., a DL-centric slot). At block 1112, the scheduling entity may transmit a demodulation reference signal (DMRS) at the beginning of the downlink traffic region (e.g., PDSCH) of the slot, and at block 1114, transmit the second DCI portion immediately after the DMRS. In some examples, the second DCI portion may be time division multiplexed and/or frequency division multiplexed with user data traffic within the downlink traffic region of the slot. In other examples, the second DCI portion may occupy all of the time-frequency resources of the downlink traffic region of the slot. For example, the second DCI portion may include a concatenation of a plurality of DCI components, each providing a downlink assignment or an uplink grant for one or more scheduled entities. In some examples, the second DCI portion may be transmitted with the same rank and modulation order as the PDSCH. In addition, the second DCI portion may be rate matched to at least the user data traffic surrounding the second DCI portion. For example, the resource assignment and scheduling circuitry 541 in coordination with the DL traffic and control channel generation and transmission circuitry 542 shown and described above in connection with FIG. 5 may transmit a slot containing the first DCI portion within a control region thereof and the DMRS and second DCI portion within a downlink traffic region thereof.

Figure 12:
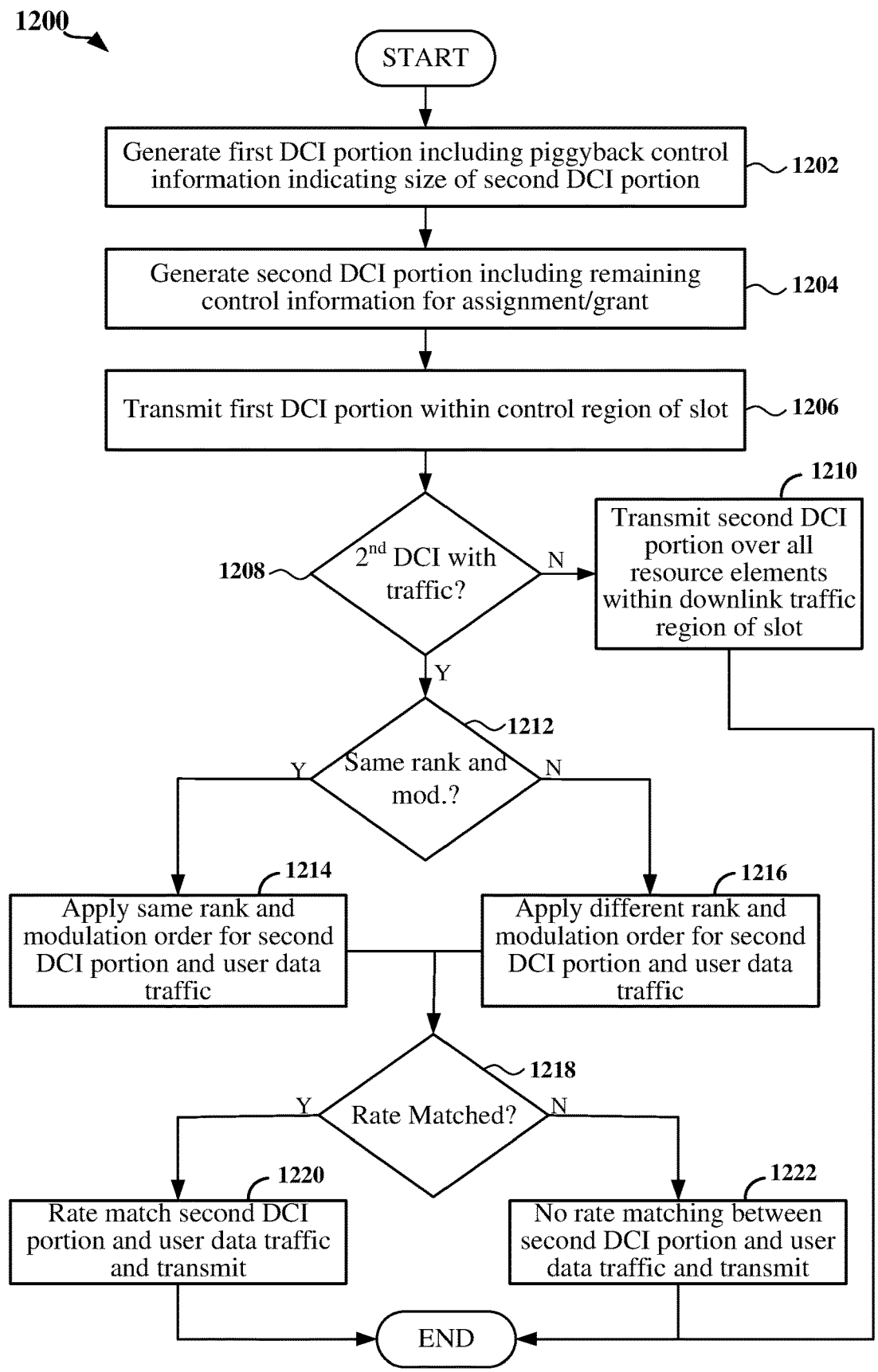
FIG. 12 is a flow chart illustrating another process for wireless communication utilizing a downlink control information (DCI) piggyback in the downlink traffic region of a slot according to an aspect of the disclosure.

FIG. 12 is a flow chart illustrating another process 1200 for wireless communication utilizing a downlink control information (DCI) piggyback in the downlink traffic region of a slot according to an aspect of the disclosure. As described below, some or all illustrated features may be omitted in a particular implementation within the scope of the present disclosure, and some illustrated features may not be required for implementation of all embodiments. In some examples, the process 1200 may be carried out by the scheduling entity illustrated in FIG. 5. In some examples, the process 1200 may be carried out by any suitable apparatus or means for carrying out the functions or algorithm described below.

At block 1202, the scheduling entity may generate a first downlink control information (DCI) portion including piggyback control information indicating at least a size of a second DCI portion. The first DCI portion may further include initial control information regarding a downlink assignment. For example, the initial control information may include the resource assignment (e.g., time-frequency resources allocated for the downlink assignment), the rank, and the modulation order for the downlink assignment. For example, the DL traffic and control channel generation and transmission circuitry 542 shown and described above in connection with FIG. 5 may generate the first DCI portion.

At block 1204, the scheduling entity may generate a second DCI portion including remaining control information regarding the downlink assignment. The remaining control information may include, for example, non-time critical control information, such as the HARQ process ID, redundancy version ID, new data indicator, transmit power control indicator, channel quality indicator request, sounding reference signal request, or downlink assignment index. For example, the DL traffic and control channel generation and transmission circuitry 542 shown and described above in connection with FIG. 5 may generate the second DCI portion.

At block 1206, the scheduling entity may transmit the first DCI portion within a control region (e.g., a PDCCH region or DL burst) of a current slot (e.g., a DL-centric slot). At block 1208, the scheduling entity may determine whether the second DCI portion will be transmitted together with user data traffic within a traffic region of the current slot. If the second DCI portion will not be transmitted together with user data traffic in the traffic region of the slot (N branch of block 1208), at block 1210, the scheduling entity may transmit the second DCI portion over all of the time-frequency resource elements of the downlink traffic region of the slot. For example, the second DCI portion may include a concatenation of a plurality of DCI components, each providing a downlink assignment or an uplink grant for one or more scheduled entities.

If the second DCI portion will be transmitted together with user data traffic in the traffic region of the slot (Y branch of block 1208), at block 1212, the scheduling entity may determine whether the same rank and modulation order will be utilized for both second DCI portion and the user data traffic. If the same rank and modulation order will be utilized for both the second DCI portion and the user data traffic (Y branch of block 1212), at block 1214, the scheduling entity may apply the same rank and modulation order to both the second DCI portion and the user data traffic. If the same rank and modulation order will not be utilized for both the second DCI portion and the user data traffic (N branch of block 1212), at block 1216, the scheduling entity may apply different ranks and modulation orders to the second DCI portion and the user data traffic.

At block 1218, the scheduling entity may determine whether the second DCI portion will be rate matched to at least the user data traffic surrounding the second DCI portion. If the second DCI portion will be rate matched to the user data traffic (Y branch of block 1218), at block 1220, the scheduling entity may rate match the second DCI portion to at least the user data traffic surrounding the second DCI portion and transmit the second DCI portion within the traffic region of the slot. If the second DCI portion will not be rate matched to the user data traffic (N branch of block 1218), at block 1222, the scheduling entity may transmit the second DCI portion within the traffic region of the slot without rate matching the second DCI portion to the user data traffic in the traffic region of the slot. For example, the resource assignment and scheduling circuitry 541 in coordination with the DL traffic and control channel generation and transmission circuitry 542 shown and described above in connection with FIG. 5 may transmit a slot containing the first DCI portion within a control region thereof and the second DCI portion within a downlink traffic region thereof.

Figure 13:
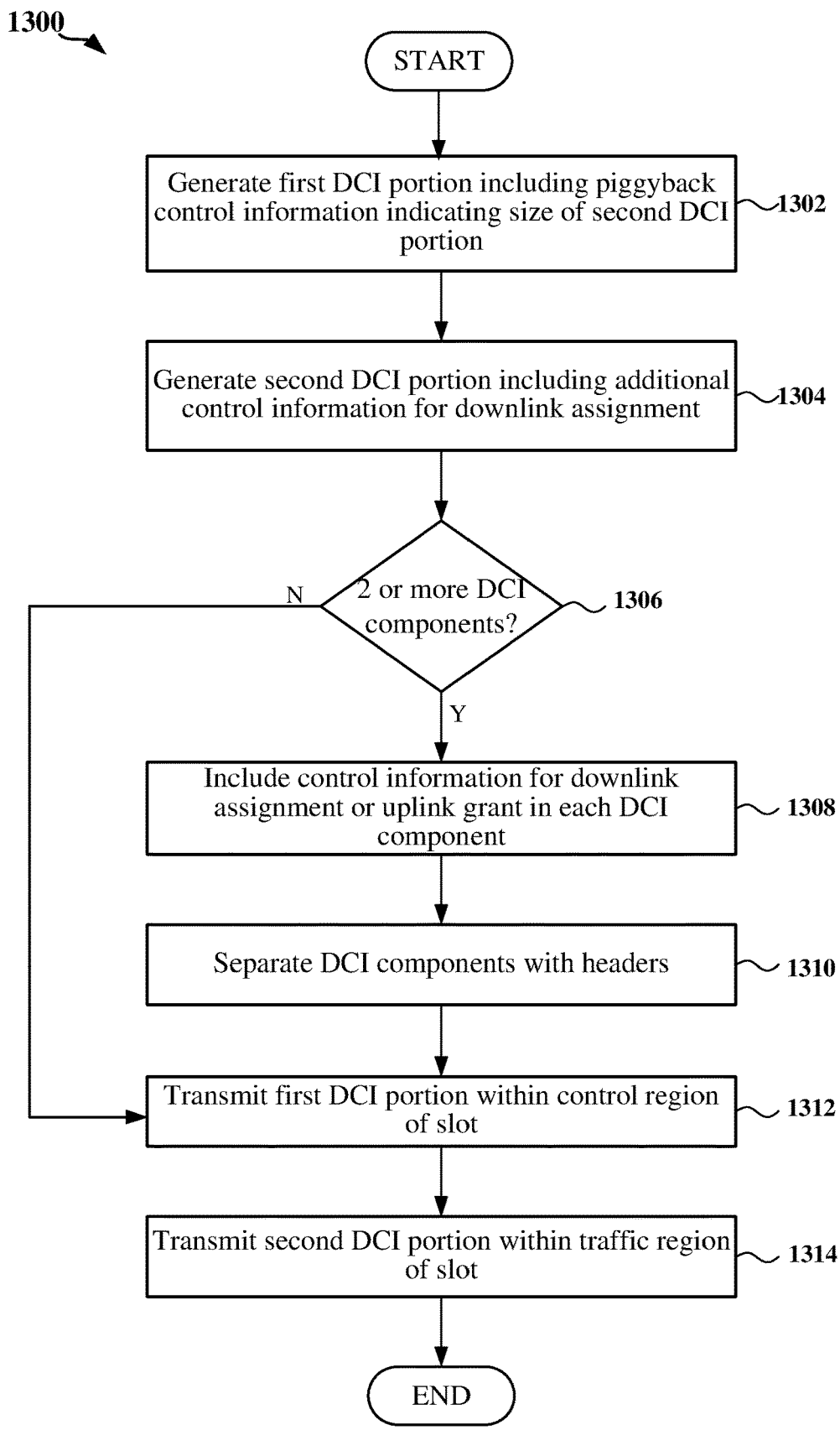
FIG. 13 is a flow chart illustrating another process for wireless communication utilizing a downlink control information (DCI) piggyback in the downlink traffic region of a slot according to an aspect of the disclosure.

FIG. 13 is a flow chart illustrating another process 1300 for wireless communication utilizing a downlink control information (DCI) piggyback in the downlink traffic region of a slot according to an aspect of the disclosure. As described below, some or all illustrated features may be omitted in a particular implementation within the scope of the present disclosure, and some illustrated features may not be required for implementation of all embodiments. In some examples, the process 1300 may be carried out by the scheduling entity illustrated in FIG. 5. In some examples, the process 1300 may be carried out by any suitable apparatus or means for carrying out the functions or algorithm described below.

At block 1302, the scheduling entity may generate a first downlink control information (DCI) portion including piggyback control information indicating at least a size of a second DCI portion. The first DCI portion may further include initial control information regarding a downlink assignment. For example, the initial control information may include the resource assignment (e.g., time-frequency resources allocated for the downlink assignment), the rank, and the modulation order for the downlink assignment. For example, the DL traffic and control channel generation and transmission circuitry 542 shown and described above in connection with FIG. 5 may generate the first DCI portion.

At block 1304, the scheduling entity may generate a second DCI portion including remaining control information regarding the downlink assignment. The remaining control information may include, for example, non-time critical control information, such as the HARQ process ID, redundancy version ID, new data indicator, transmit power control indicator, channel quality indicator request, sounding reference signal request, or downlink assignment index. For example, the DL traffic and control channel generation and transmission circuitry 542 shown and described above in connection with FIG. 5 may generate the second DCI portion.

At block 1306, the scheduling entity may determine whether the second DCI portion will include two or more DCI components. If the second DCI portion will include two or more DCI components (Y branch of block 1306), at block 1308, the scheduling entity may include control information for a downlink assignment or uplink grant in each DCI component, and at block 1310, separate each of the DCI components with a respective header, with each header containing a UE ID field type identifying the scheduled entity or group of scheduled entities intended to receive the DCI component following the header. Thus, the second DCI portion may include a concatenation of a plurality of DCI components, each providing a downlink assignment or an uplink grant for one or more scheduled entities. For example, the DL traffic and control channel generation and transmission circuitry 542 shown and described above in connection with FIG. 5 may include separate control information within two or more DCI components of the second DCI portion.

At block 1312, the scheduling entity may transmit the first DCI portion within a control region (e.g., a PDCCH region or DL burst) of a current slot (e.g., a DL-centric slot). At block 1314, the scheduling entity may further transmit the second DCI portion within a downlink traffic region (e.g., PDSCH) of the current slot. In some examples, the second DCI portion may occupy all of the time-frequency resource elements of the downlink traffic region of the slot. For example, the resource assignment and scheduling circuitry 541 in coordination with the DL traffic and control channel generation and transmission circuitry 542 shown and described above in connection with FIG. 5 may transmit a slot containing the first DCI portion within a control region thereof and the second DCI portion within a downlink traffic region thereof.

In one configuration, the scheduling entity 500 includes means for generating a first downlink control information portion including piggyback control information indicating at least a size of a second downlink control portion, means for generating the second downlink control portion including remaining control information, means for transmitting the first downlink control portion within a downlink control region of a slot, and means for transmitting the second downlink control portion within a downlink traffic region of the slot. In one aspect, the aforementioned means may be the processor 504 configured to perform the functions recited by the aforementioned means. In another aspect, the aforementioned means may be a circuit or any apparatus configured to perform the functions recited by the aforementioned means.

In some examples, the means for generating the first downlink control portion including piggyback control information indicating at least the size of the second downlink control portion may be the DL traffic and control channel generation and transmission circuitry 542. In some examples, the means for generating the second downlink control portion including remaining control information may be the DL traffic and control channel generation and transmission circuitry 542. In some examples, the means for transmitting the first downlink control portion within the downlink control region of the slot may be the resource assignment and scheduling circuitry 541 in coordination with the DL traffic and control channel generation and transmission circuitry 542 and transceiver 510. In some examples, the means for transmitting the second downlink control portion within the downlink traffic region of the slot may be the resource assignment and scheduling circuitry 541 in coordination with the DL traffic and control channel generation and transmission circuitry 542 and transceiver 510.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5, and 6 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising, at a scheduling entity:
generating a first control information portion comprising first control information indicating at least a size of a second control information portion;
transmitting the first control information portion within a control region of a slot;
generating the second control information portion comprising second control information associated with a grant for the transmission of data traffic between the scheduling entity and one or more scheduled entities in wireless communication with the scheduling entity in one or more subsequent slots; and
transmitting the second control information portion over all resource elements within a traffic region of the slot;
wherein the second control information comprises a channel quality indicator request, a sounding reference signal request, or both.

2. The method of claim 1, wherein:
the first control information portion further comprises initial control information for the grant;
the initial control information comprises one or more of a resource assignment, a rank, or a modulation order for the grant; and
the second control information comprises a transmit power control indicator.

3. The method of claim 1, wherein the second control information portion further comprises one or more additional grants for the one or more subsequent slots.

4. The method of claim 1, wherein the first control information further indicates a code rate of the second control information portion.

5. The method of claim 1, wherein:
the first control information portion further comprises initial control information related to the grant;
the initial control information comprises a resource assignment, a rank, and a modulation order for the grant;
the resource assignment is commonly assigned to two or more scheduled entities, and wherein the method further comprises:
scrambling a cyclic redundancy check of the second control information portion with an identifier of one of the two or more scheduled entities.

6. The method of claim 1, wherein transmitting the second control information portion further comprises:
distributing the second control information portion across the resource elements allocated to the second control information portion within the traffic region of the slot.

7. The method of claim 1, further comprising:
scrambling a cyclic redundancy check of the first control information portion with a special radio network temporary identifier (RNTI) indicating that the second control information portion occupies all of the resource elements within the traffic region of the slot.

8. A method of wireless communication, comprising, at a scheduling entity:
generating a first control information portion comprising first control information indicating at least a size of a second control information portion;
transmitting the first control information portion within a control region of a slot;
generating the second control information portion comprising second control information comprising a concatenation of two or more control information components, each of the control information components comprising respective complete control information for a respective grant for the transmission of data traffic between the scheduling entity and one or more scheduled entities; and transmitting the second control information portion over all resource elements within a traffic region of the slot;

wherein the second control information comprises a channel quality indicator request, a sounding reference signal request, or both.

9. The method of claim 8, wherein the two or more control information components are separated by respective headers.

10. The method of claim 8, wherein the two or more control information components are associated with multiple scheduled entities, and further comprising:

scrambling a cyclic redundancy check of the second control information portion with a group radio network temporary identifier (RNTI) or a broadcast RNTI associated with the multiple scheduled entities.

11. The method of claim 8, wherein the two or more control information components comprise user-specific control information and common control information.

12. A scheduling entity within a wireless communication network, comprising:

a processor;

a memory communicatively coupled to the processor; and a transceiver communicatively coupled to the processor, wherein the processor is configured to:

generate a first control information portion comprising first control information indicating at least a size of a second control information portion;

transmit the first control information portion within a control region of a slot;

generate the second control information portion comprising second control information associated with a grant for the transmission of data traffic between the scheduling entity and one or more scheduled entities in wireless communication with the scheduling entity in one or more subsequent slots; and transmit the second control information portion over all resource elements within a traffic region of the slot;

wherein the second control information comprises a channel quality indicator request, a sounding reference signal request, or both.

13. The scheduling entity of claim 12, wherein:

the first control information portion further comprises initial control information for the grant;

the initial control information comprises one or more of a resource assignment, a rank, or a modulation order for the grant; and the second control information comprises a transmit power control indicator.

14. The scheduling entity of claim 12, wherein the second control information portion further comprises one or more additional grants for the one or more subsequent slots.

15. The scheduling entity of claim 12, wherein the first control information further indicates a code rate of the second control information portion.

16. The scheduling entity of claim 12, wherein the processor is further configured to:

scramble a cyclic redundancy check of the first control information portion with a special radio network temporary identifier (RNTI) indicating that the second control information portion occupies all of the resource elements within the traffic region of the slot.

17. A scheduling entity within a wireless communication network, comprising:

a processor;

a memory communicatively coupled to the processor; and a transceiver communicatively coupled to the processor, wherein the processor is configured to:

generate a first control information portion comprising first control information indicating at least a size of a second downlink control information portion;

transmit the first control information portion within a control region of a slot;

generate the second downlink control information portion comprising second control information comprising a concatenation of two or more control information components, each of the control information components comprising respective complete control information for a respective grant for the transmission of data traffic between the scheduling entity and one or more scheduled entities; and transmit the second control information portion over all resource elements within a traffic region of the slot;

wherein the second control information comprises a channel quality indicator request, a sounding reference signal request, or both.

18. The scheduling entity of claim 17, wherein the two or more control information components are associated with multiple scheduled entities, and wherein the processor is further configured to:

scramble a cyclic redundancy check of the second control information portion with a group radio network temporary identifier (RNTI) or a broadcast RNTI associated with the multiple scheduled entities.

19. The scheduling entity of claim 17, wherein the two or more control information components comprise user-specific control information and common control information.

20. The scheduling entity of claim 17, wherein the two or more control information components are separated by respective headers.

21. A scheduling entity within a wireless communication network, comprising:

means for generating a first control information portion comprising first control information indicating at least a size of a second control information portion;

means for transmitting the first control information portion within a control region of a slot;

means for generating the second control information portion comprising second control information associated with a grant for the transmission of data traffic between the scheduling entity and one or more scheduled entities in wireless communication with the scheduling entity in one or more subsequent slots; and means for transmitting the second control information portion over all resource elements within a traffic region of the slot;

wherein the second control information comprises a channel quality indicator request, a sounding reference signal request, or both.

22. The scheduling entity of claim 21, wherein:

the first control information portion further comprises initial control information for the grant;

the initial control information comprises one or more of a resource assignment, a rank, or a modulation order for the grant; and the second control information comprises a transmit power control indicator.

23. The scheduling entity of claim 21, wherein the second control information portion further comprises one or more additional grants for the one or more subsequent slots.

24. The scheduling entity of claim 21, wherein the first control information further indicates a code rate of the second control information portion.

25. The scheduling entity of claim 21, further comprising:
means for scrambling a cyclic redundancy check of the first control information portion with a special radio network temporary identifier (RNTI) indicating that the second control information portion occupies all of the resource elements within the traffic region of the slot.

* * * * *